(12) United States Patent
Ohshima et al.

(10) Patent No.: US 6,533,182 B1
(45) Date of Patent: Mar. 18, 2003

(54) TWO-DIMENSIONAL DOT CODE AND READER THEREOF

(75) Inventors: Manabu Ohshima, Kyoto (JP); Tomohiro Inoue, Kyoto (JP); Hideki Chujo, Kyoto (JP)

(73) Assignee: Omron Corporation, Kyoto (JP)

( * ) Notice: Subject to any disclaimer, the term of this patent is extended or adjusted under 35 U.S.C. 154(b) by 94 days.

(21) Appl. No.: 09/666,597

(22) Filed: Sep. 20, 2000

(30) Foreign Application Priority Data

Sep. 21, 1999 (JP) .............................................. 11-266843

(51) Int. Cl.⁷ .............................................. G06K 19/06
(52) U.S. Cl. ........................................ 235/494; 235/454
(58) Field of Search ................................... 235/494, 454

(56) References Cited

U.S. PATENT DOCUMENTS

| | | | |
|---|---|---|---|
| 4,782,221 A | 11/1988 | Brass et al. | |
| 5,128,526 A | * 7/1992 | Yoshida | 235/460 |
| 5,153,928 A | 10/1992 | Iizuka | |
| 5,740,286 A | 4/1998 | Esashi | |
| 6,116,507 A | * 9/2000 | Fukuda et al. | 235/494 |
| 6,116,510 A | * 9/2000 | Nishino | 235/494 |
| 6,119,937 A | * 9/2000 | Wang et al. | 235/494 |
| 6,131,807 A | * 10/2000 | Fukuda et al. | 235/494 |

* cited by examiner

*Primary Examiner*—Harold I. Pitts
(74) *Attorney, Agent, or Firm*—Dickstein Shapiro Morin & Oshinsky LLP

(57) ABSTRACT

Timing marks are printed at the left and right of a data mark of a two-dimensional dot code. Whether or not the data mark exists is determined based on the position on the line connecting the centers of the timing marks at both ends at the left and right of the data mark.

10 Claims, 22 Drawing Sheets

IMAGE READ DIRECTION 31
32L
33
32R 31
32L
33
32R

PRINTED DOT CODE      IMAGE READ BY READER

FIG.16

| 1 | 2 | 3 |
|---|---|---|
| 4 |   | 5 |
| 6 | 7 | 8 |

FIG.17

| LIST NO. | DETECTED X COORDINATE | DETECTED Y COORDINATE | REFERENCE POSITION NO. | DISTANCE(d') |
|---|---|---|---|---|
| 1 | 20 | 44 | 1 | 1 |
| 2 | 30 | 43 | 3 | 0 |
| 3 | 34 | 45 | 4 | 2 |
| ⋮ | ⋮ | ⋮ | ⋮ | ⋮ |
| ⋮ | ⋮ | ⋮ | ⋮ | ⋮ |

| REFERENCE POSITION NO. | REFERENCE X COORDINATE | REFERENCE Y COORDINATE | DOT DETECTION RESULT |
|---|---|---|---|
| 1 | 20 | 43 | 1 |
| 2 | 25 | 43 | 0 |
| 3 | 30 | 43 | 1 |
| ⋮ | ⋮ | ⋮ | ⋮ |
| ⋮ | ⋮ | ⋮ | ⋮ |

TWO-DIMENSIONAL DOT CODE AND READER THEREOF

BACKGROUND OF THE INVENTION

1. Field of the Invention

This invention relates to a two-dimensional dot code and a reader thereof and in particular to a two-dimensional dot code and a reader thereof for making it possible to read a dot code more accurately.

2. Description of the Related Art

In recent years, a two-dimensional dot code has been used in various fields. The two-dimensional dot code comprises a plurality of cells as basic units in two dimensions to represent a predetermined code.

Such a two-dimensional dot code in a related art often is imaged by a video camera, etc., for example, and is read from the provided image. However, to use the two-dimensional dot code imaged by a video camera and determined from the provided image, cells as basic units need to be made large to some extent because of the nature of the two-dimensional dot code. Consequently, the two-dimensional dot code itself requires a comparatively large area; this is a problem.

Then, a dot code represented using dots of the minimum units to print by a printer as basic units is proposed.

That is, the dot code is represented based on the presence or absence of dots as the minimum units that can be represented by a printer, for example, as shown in FIG. 1. Therefore, it is made possible to represent more codes in a narrow range.

However, the dot positions of such a two-dimensional dot code change because of variations in printer heads. Consequently, a dot may be printed at a print position P2 at a distance of a predetermined offset amount from an original print position P1, for example, as shown in FIG. 1. In such a case, when two-dimensional dot code is read optically by a scanner, if the offset is large, it is feared that the two-dimensional dot code may be read in error as if a dot were not printed although the dot is printed actually.

Such a read error can be prevented to some extent by enhancing the precision of a printer for printing a two-dimensional dot code or a scanner for reading the code; however, to do this, it becomes necessary to manufacture a high-precision printer or scanner, resulting in an increase in costs; this is a problem.

SUMMARY OF THE INVENTION

It is an object of the present invention to make it possible to read a two-dimensional dot code accurately without much enhancing the precision of a printer or a reader.

In a two-dimensional dot code according to the present invention, timing marks for indicating the positions of dots for representing the code is provided at at least one end on a line in a direction perpendicular to the read direction of the dots for representing the code.

A reader according to the present invention comprises first detection means for detecting the positions of timing marks placed at both ends on the lines in a direction perpendicular to the read direction of the dots for representing a code; and second detection means for detecting the dots representing the code placed between the timing marks based on the timing marks at both ends detected by the first detection means.

In the two-dimensional dot code, the timing marks for indicating the positions of dots for representing the code are placed at at least one end on a line in a direction perpendicular to the read direction of the dots for representing the code.

In the reader, the dots representing the code placed between the timing marks are detected based on the timing marks placed at both ends on the lines in a direction perpendicular to the read direction of the dots for representing the code.

BRIEF DESCRIPTION OF THE DRAWINGS

In the accompanying drawings:

FIG. 16 is a drawing to show priority levels in pixel density determination;

FIG. 17 is a drawing to show an example of a detected dot list;

PREFERRED EMBODIMENTS OF THE INVENTION

Preferred embodiments according to the present invention will be described as follows referring to the accompanying drawings.

Figure 1:
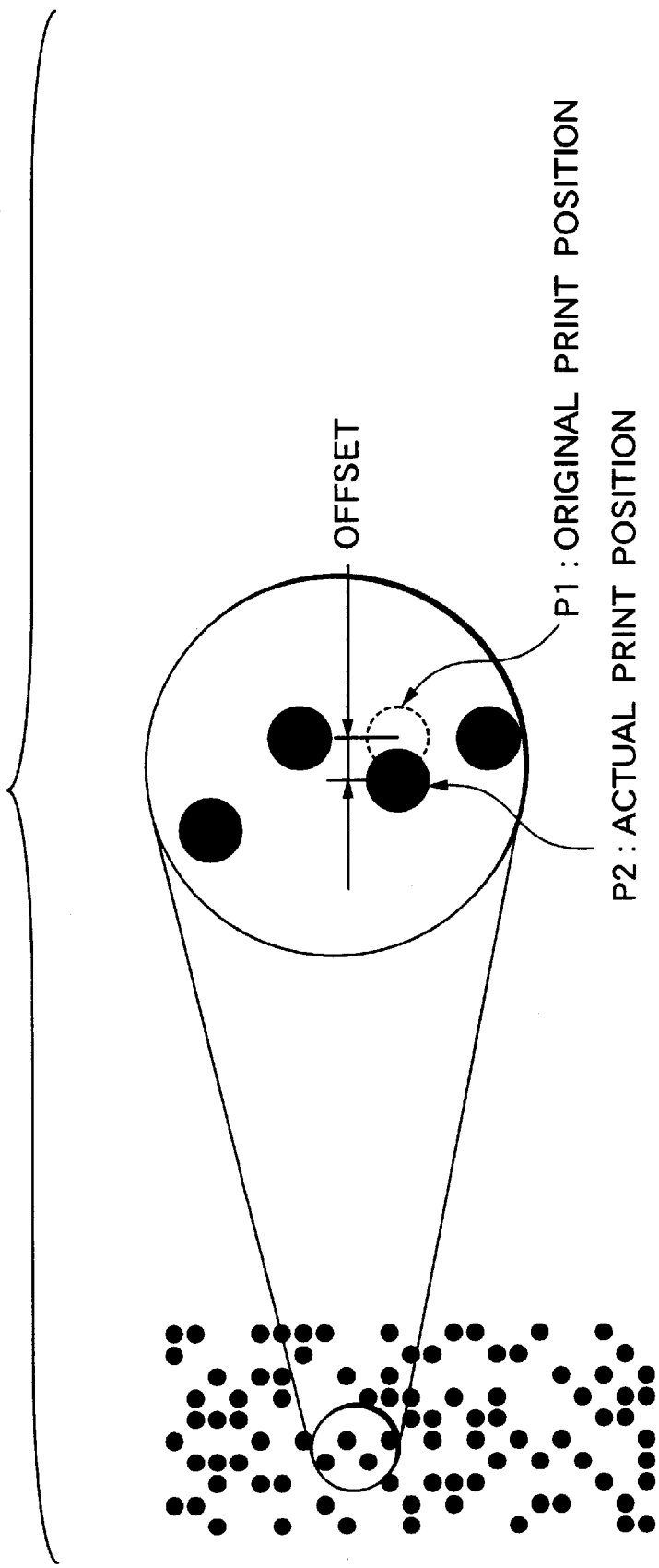
FIG. 1 is a drawing to show an example of a two-dimensional dot code in a related art.
Figure 2:
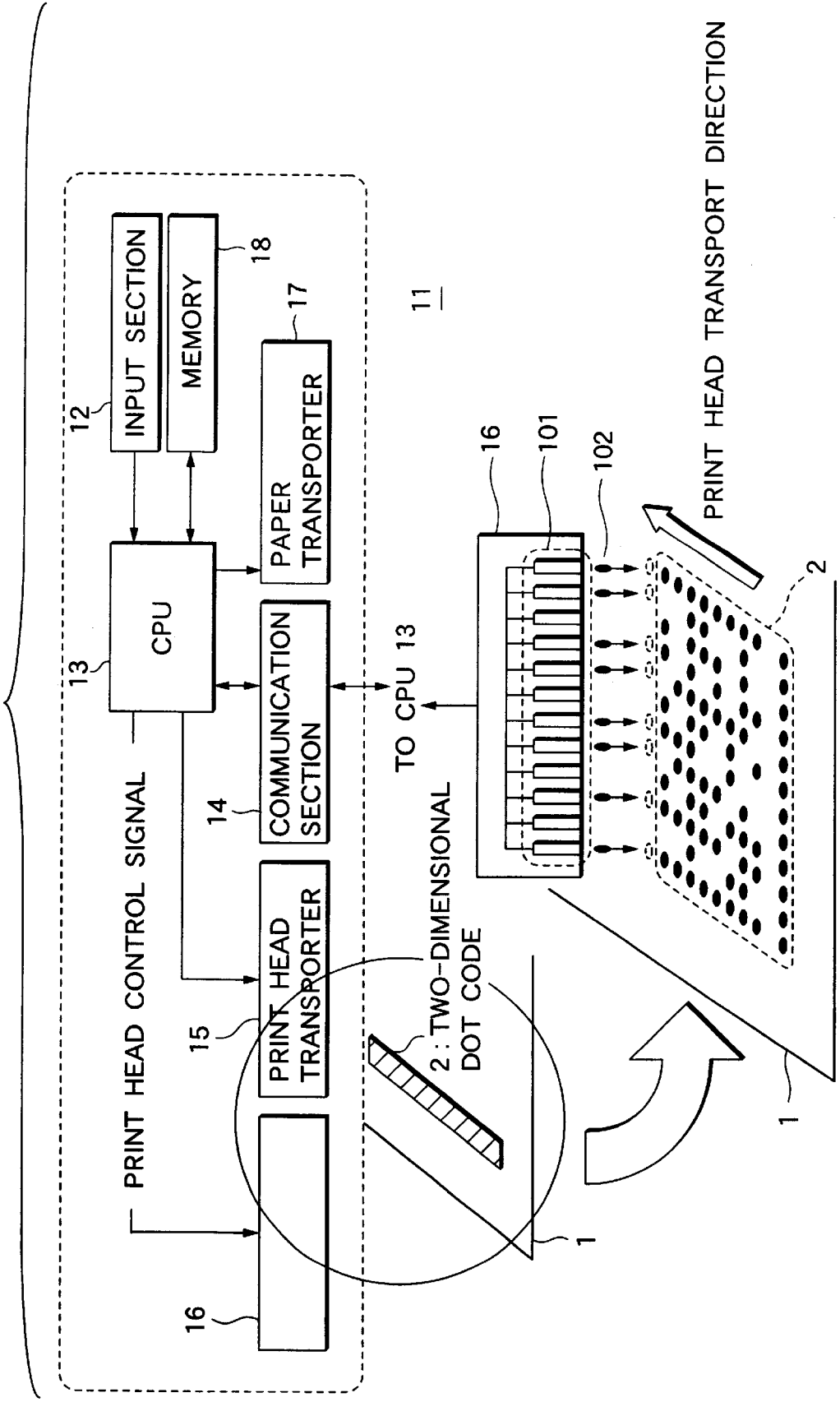
FIG. 2 is a block diagram to show a configuration example of a printer incorporating the invention.

FIG. 2 shows a configuration example of a printer incorporating the invention. A CPU 13 of a printer 11 controls a print head transporter 15, a print head 16, and a paper transporter 17 in response to a command from an input section 12 made up of buttons, switches, etc. The print head transporter 15 transports the print head 16 in a subscanning direction in response to a command from the CPU 13. The print head 16 prints a two-dimensional dot code 2 on a card 1 in response to a print head control signal from the CPU 13. The paper transporter 17 transports the card 1 to a predetermined position in response to a command from the CPU 13. Memory 18 stores under the control of the CPU 13, data supplied through a communication section 14 via a network such as a LAN.

The print head 13 has a plurality of print nozzles 101 for jetting ink to the card 1, thereby printing the two-dimensional dot code 2 consisting of dots.

Next, the operation is as follows: When the user operates the input section 12 to give a print command, the CPU 13 reads print data through the communication section 14 and stores the print data in the memory 18. Then, the CPU 13 controls the paper transporter 17 for transporting the card 1 to a predetermined position. The CPU 13 converts the read print data into a print head control signal and supplies the print head control signal to the print head 16 and controls the print head transporter 15 for moving the print head 16 in the subscanning direction relatively to the card 1. The print nozzles 101 of the print head 16 jet ink 102 for printing the two-dimensional dot code 2 consisting of dots on the card 1.

Figure 3:
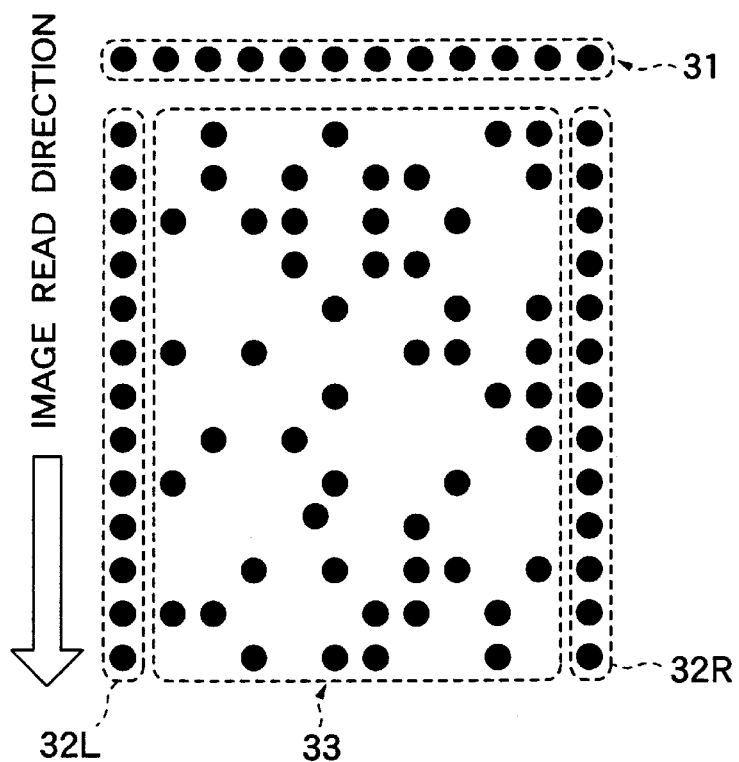
FIG. 3 is a drawing to show an example of a two-dimensional dot code incorporating the invention.

FIG. 3 shows a configuration example of the two-dimensional dot code 2 thus printed on the card 1. In the example in FIG. 3, a start position mark 31 is printed as one row of dots at the beginning. The start position mark 31 is followed by a blank row, followed by left and right timing marks 32L and 32R and a data mark 33 which are printed. The dots making up the left and right timing marks 32L and 32R are printed on all rows. The dots making up the data mark 33 are printed corresponding to the code.

Printing is executed in order starting at the start position mark 31, from top to bottom (in the subscanning direction in FIG. 3. In other words, the print head 16 is transported from top to bottom.

Although a detailed description is given later, if the timing marks 32L and 32R are thus printed, whether or not dots exist is determined on the line connecting the timing marks 32L and 32R at the left and right ends, whereby it is made possible to accurately determine whether or not the dots making up the data mark 33 exist.

Figure 4:
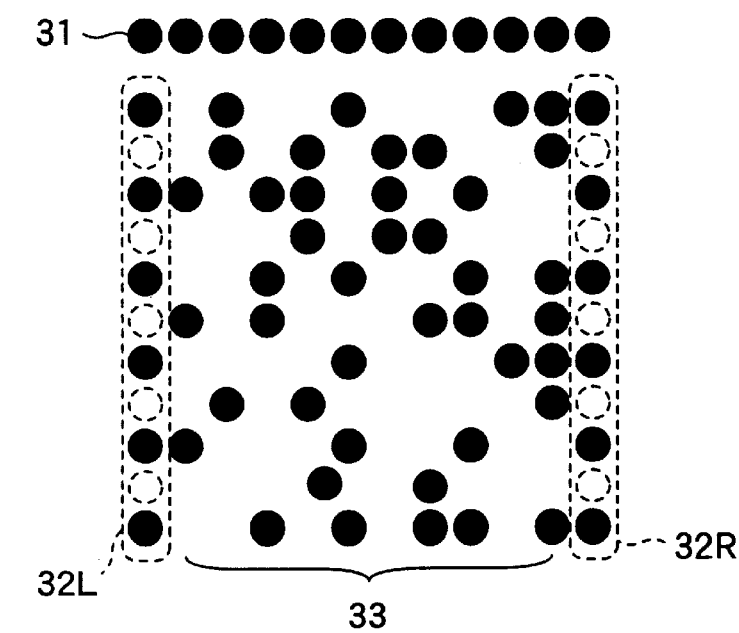
FIG. 4 is a drawing to show an example of a two-dimensional dot code incorporating the invention.
Figure 5:
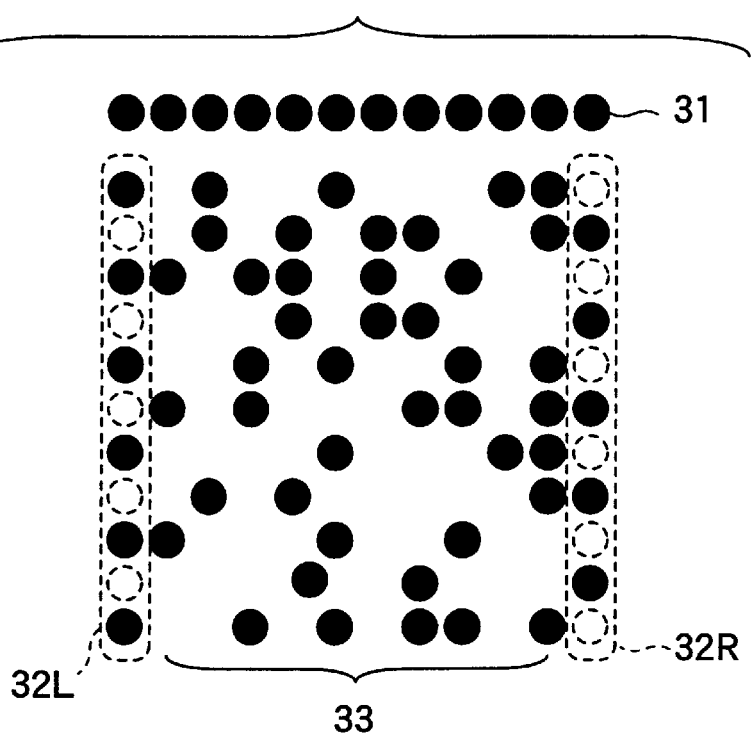
FIG. 5 is a drawing to show an example of a two-dimensional dot code incorporating the invention.

When the diameter of one dot is large, if the timing marks 32L and 32R are printed on every row as shown in FIG. 3, the dots making up the timing mark 32L, 32R may overlap each other because of a position shift. In such a case, for example, as shown in FIG. 4, the timing marks 32L and 32R can be printed at predetermined intervals (in the figure in FIG. 4, every other row). Alternatively, as shown in FIG. 5, the timing marks 32L and 32R can be printed alternately (if a dot of the timing mark 32L is printed, a dot of the timing mark 32R is not printed on the row; if a dot of the timing mark 32R is printed, a dot of the timing mark 32L is not printed on the row).

In doing so, the dots of the timing mark 32L, 32R can be prevented from overlapping from top to bottom. Consequently, the positions of the timing marks 32L and 32R can be detected accurately and by extension whether or not the dots of the data mark 33 based on the timing marks 32L and 32R can be determined accurately.

Figure 6:
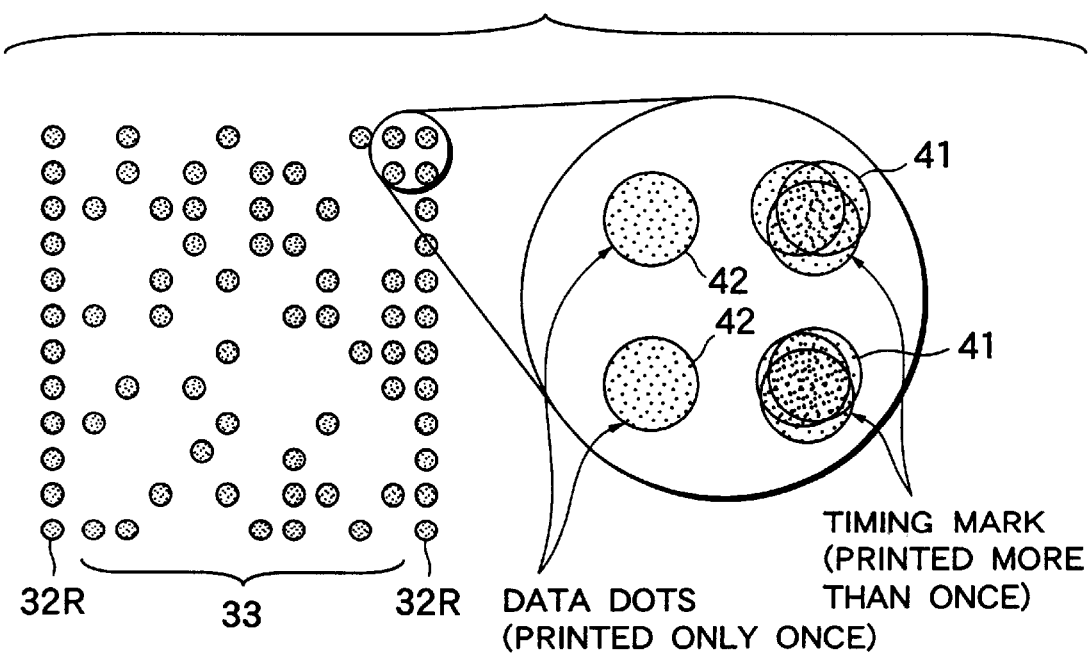
FIG. 6 is a drawing to show an example of a two-dimensional dot code incorporating the invention.

Since the data mark 33 is thus read based on the timing marks 32L and 32R, the timing marks 32L and 32R need to be printed reliably as much as possible so that they can be read. Then, for example, as shown in FIG. 6, the timing marks 32L and 32R may be printed more than once although the data mark 33 is read only once. In doing so, dots 41 making up the timing mark 32L, 32R are represented in dark color as compared with dots 42 making up the data mark 33 as shown in FIG. 6, and at the read time, the fear that the dots printed in fair ink color cannot be read is lessened.

Figure 7:
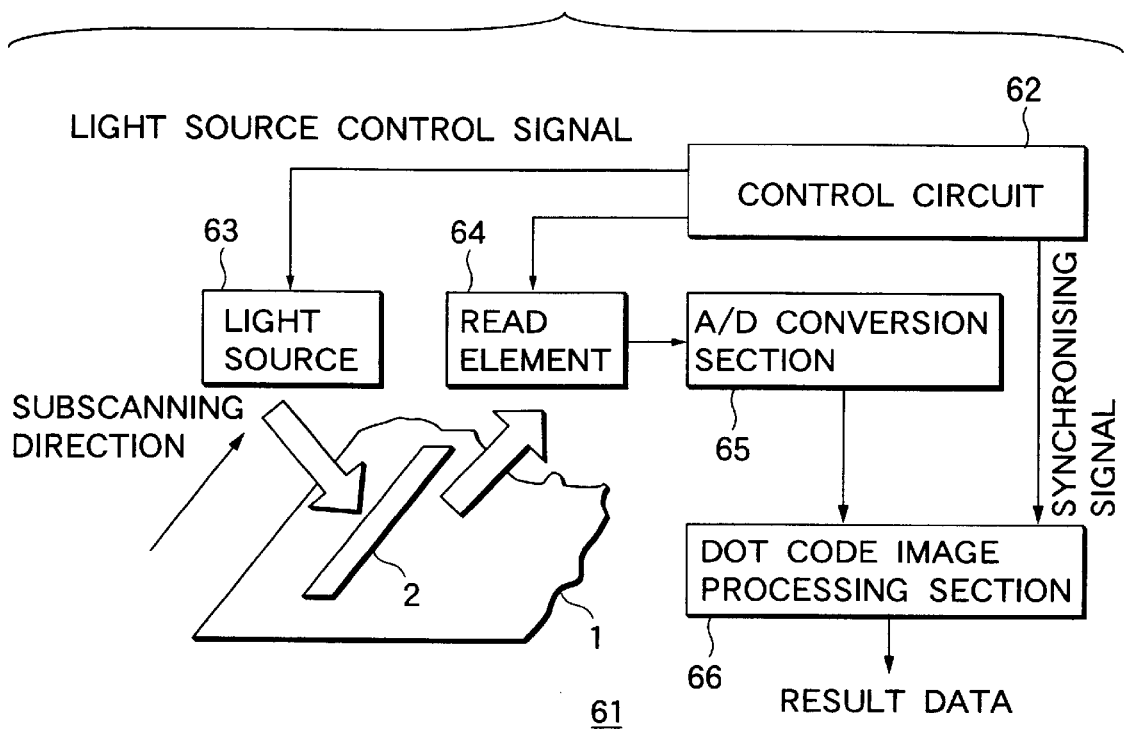
FIG. 7 is a block diagram to show a configuration example of a reader incorporating the invention.

FIG. 7 shows a configuration example of a reader 61 for reading the card 1 on which the two-dimensional dot code 2 is thus printed. The reader 61 has a control circuit 62 implemented as a microcomputer, etc., for example, for controlling a light source 63 for generating light to illuminate the card 1 on which the two-dimensional dot code 2 is printed. A read element 64 implemented as a CCD row sensor, etc., is controlled by the control circuit 62 for reading the two-dimensional dot code 2 on the card 1 and outputting the read image signal to an A/D conversion section 65. The A/D conversion section 65 converts the analog input image signal into a digital image signal and outputs the digital image signal to a dot code image processing circuit 66. A synchronizing signal synchronized with reading the two-dimensional dot code 2 is also supplied to the dot code image processing circuit 66 from the control circuit 62. The dot code image processing circuit 66 reads the image data input from the A/D conversion section 65 in synchronization with the synchronizing signal and outputs the read result to an external system.

At the reading time, the read element 64 electronically scans in the main scanning direction (horizontal direction in FIG. 3) and the subscanning direction (from top to bottom in FIG. 3).

Figure 8:
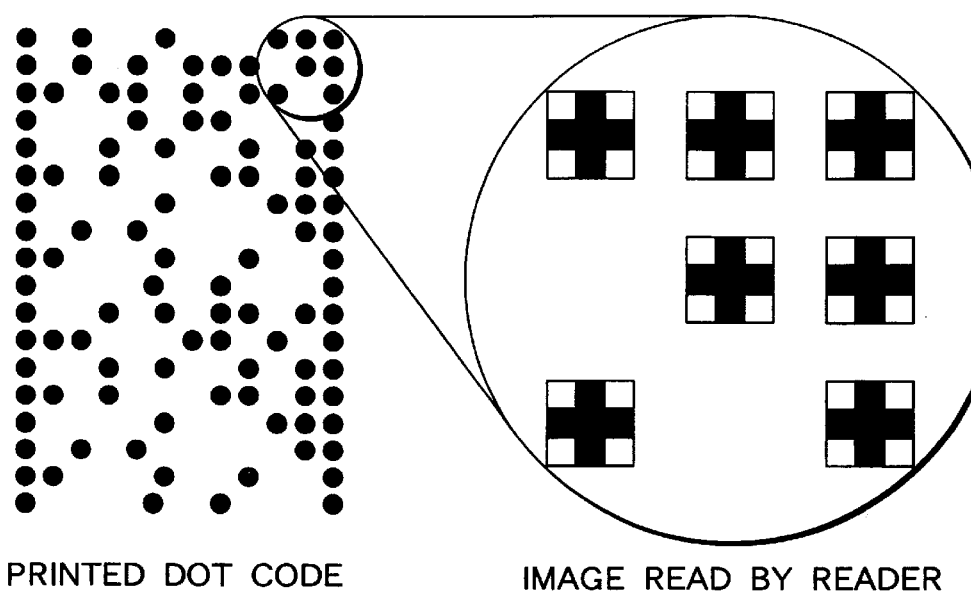
FIG. 8 is a drawing to show an example of an image read by the reader in FIG. 7.

The reader 61 has a higher resolution than the printer 11 has. For example, assuming that one dot printed on the printer 11 corresponds to three X three pixels of the reader 61, an image read by the reader 61 becomes as shown in FIG. 8. That is, the center pixel of the three X three pixels becomes the darkest, the four pixels above and below and at the left and right of the center pixel become the second darkest, and the four pixels slantingly adjacent to the center pixel become the lightest.

Next, dot read processing will be discussed with reference to a flowchart of FIG. 9. First, at step S1, the dot code image processing circuit 66 executes processing of detecting a start position mark 31. At step S2, the dot code image processing circuit 66 determines whether or not the start position mark 31 is detected. If the start position mark 31 is not yet detected, the dot code image processing circuit 66 returns to step S1 and again executes processing of detecting a start position mark 31. The start position mark 31 is printed over a predetermined width on one row in the direction perpendicular to the transport direction of the card 1 (subtransporting direction) as shown in FIG. 3, thus whether or not the start position mark 31 is detected can be checked from the fact.

If the start position mark 31 is detected, the dot code image processing circuit 66 proceeds to step S3 and computes the center coordinates of the start position mark 31. To detect the start position mark, dot detection processing shown in FIG. 13 may be executed although a detailed description is given later.

Next, the dot code image processing circuit 66 proceeds to step S4 and executes detection processing of timing marks 32L and 32R. At step S5, the dot code image processing circuit 66 determines whether or not the timing marks 32L and 32R are detected. If the timing marks 32L and 32R are not detected, the dot code image processing circuit 66 returns to step S4 and again executes the detection processing. Each timing mark is printed at the left and right end parts of the data mark 33 in the direction perpendicular to the start position mark 31 (parallel direction with the subscanning direction) as shown in FIG. 3, thus whether or not the timing marks are detected can be checked from the fact. To detect the timing marks, dot detection processing shown in FIG. 13 may be executed.

If the timing marks 32L and 32R are detected, the dot code image processing circuit 66 proceeds to step S6 and executes one-row dot detection processing described later in detail with reference to flowcharts of FIGS. 10 and 11. At the step, whether or not one-row dots of the data mark 33 exist is determined. At step S7, in a slanting direction determines whether or not processing of the data mark 33 corresponding to the timing marks 32L and 32R on all rows terminates. If the processing does not yet terminate, the dot code image processing circuit 66 returns to step S4 and repeats step S4 and the later steps. If it is determined at step S7 that processing of the data mark 33 corresponding to the timing marks 32L and 32R on all rows terminates, the dot read processing is terminated.

Next, the one-row dot detection processing at step S6 in FIG. 9 will be discussed in detail with reference to flowcharts of FIGS. 10 and 11. First, at step S21, the dot code image processing circuit 66 detects the coordinates of the timing marks 32L and 32R at both ends. For example, now assuming that processing of the third row from the top of FIG. 12 is performed, the x and y coordinates of the timing mark parts 32L1 and 32R1 are detected. That is, the coordinates of points P1 and P12 in FIG. 12 are detected. Next, at step S22, in this case, the dot code image processing circuit 66 resets a counter for counting the number of columns.

At step S23, the dot code image processing circuit 66 computes a line L1 provided by connecting the centers of the timing mark parts 32L1 and 32R1 and calculates reference coordinates x2 and y2 defining the leftmost dot position of the data mark 33 defined by the start position mark 31 on the line L1 (ideally, the value of y2 becomes equal to the value of y1 of the y coordinate of the point P1). That is, the coordinates of point P2 (x2, y2) in FIG. 12 are calculated. Next, at step S24, the dot code image processing circuit 66 increments the counter reset at step S22 by one and determines whether or not the counter value becomes larger than the number of columns of the data mark 33, namely, whether or not processing for all columns of the data mark 33 terminates. If the processing does not yet terminate, the dot code image processing circuit 66 returns to step S23 and executes processing of calculating the reference coordinates of the next column.

Figure 13:
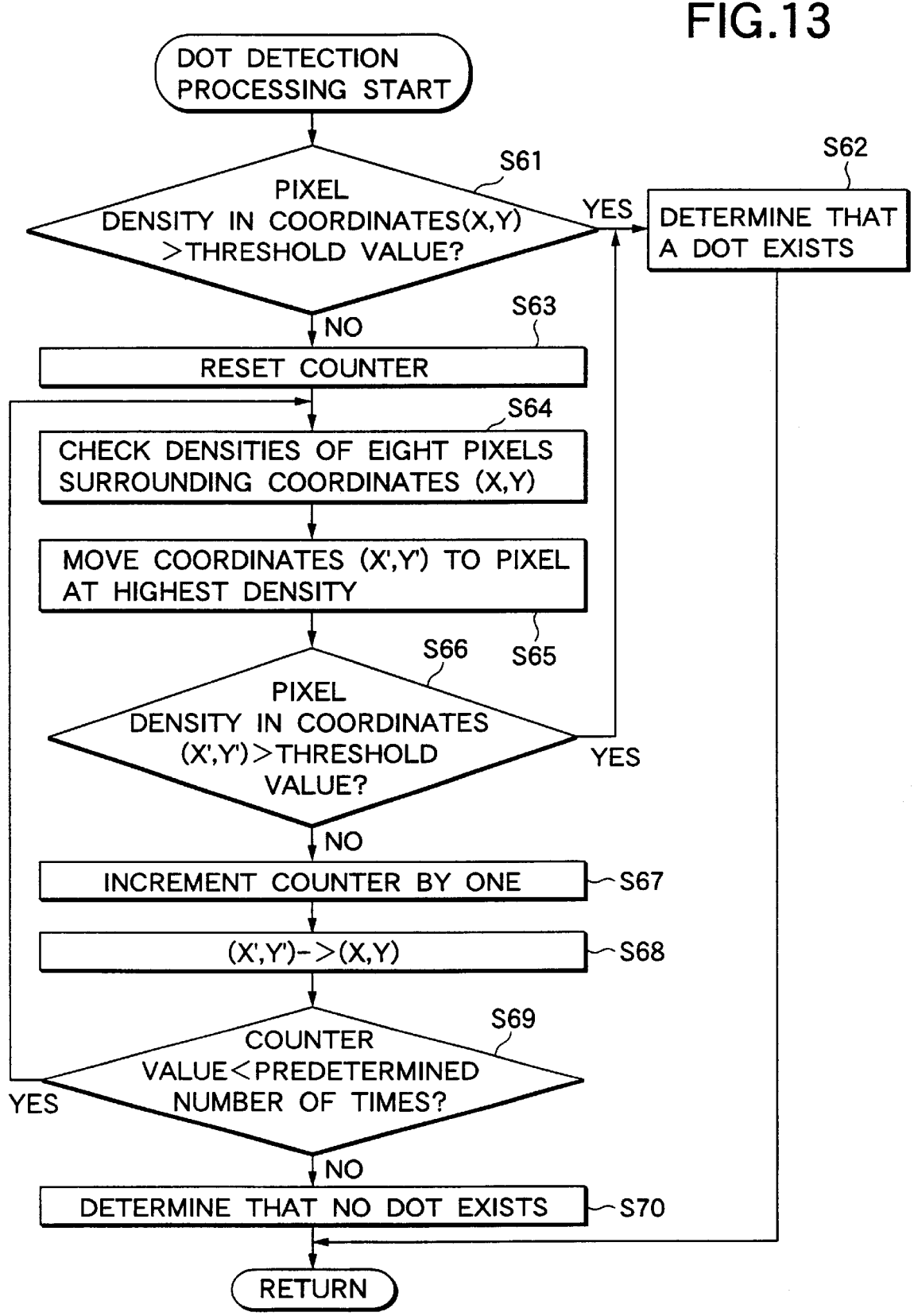
FIG. 13 is a flowchart to describe details of dot detection processing at step S27 in FIG. 11.
Figure 14:
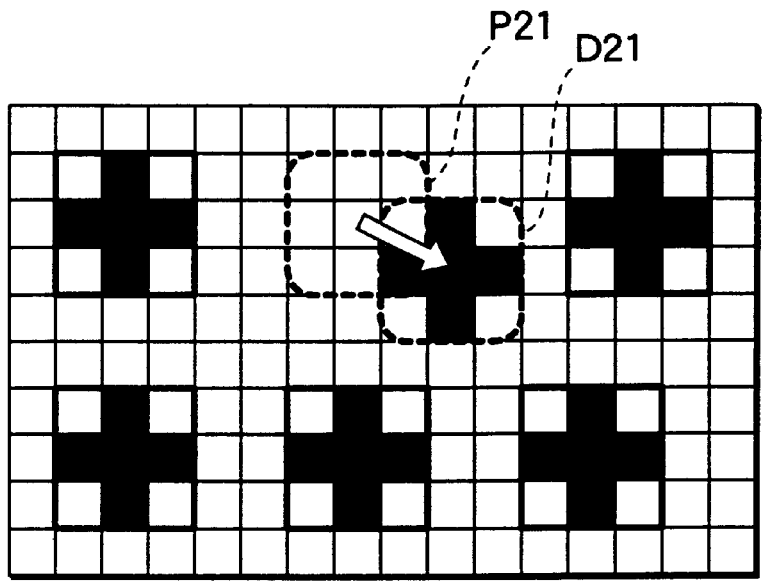
FIG. 14 is a drawing to describe a print shift of a dot.
Figure 15:
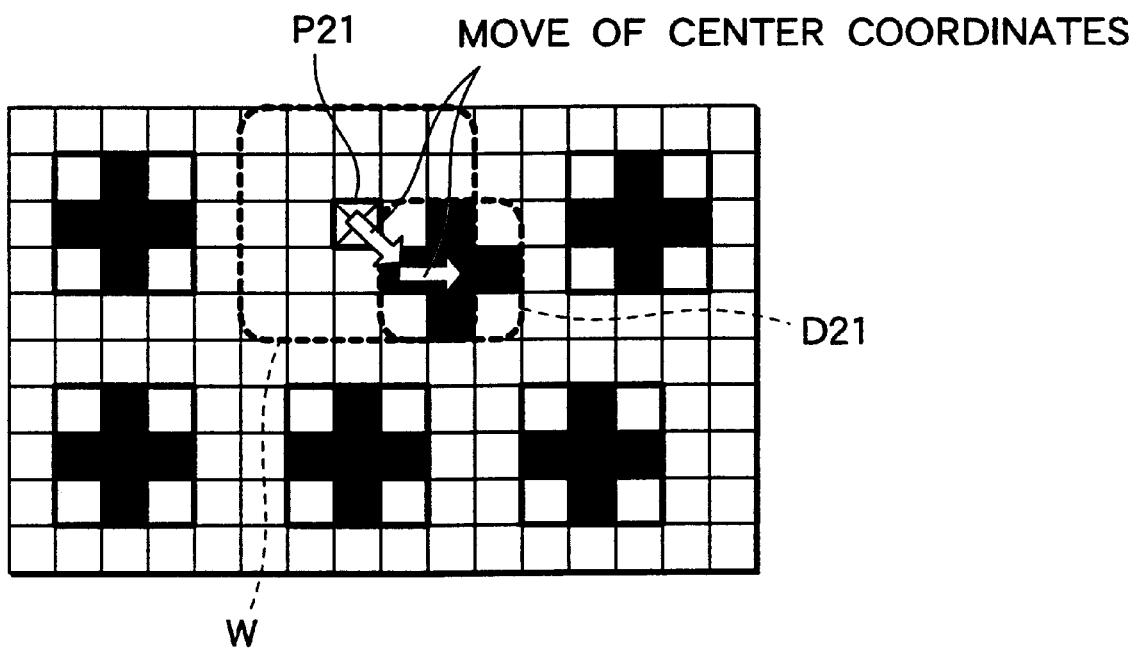
FIG. 15 is a drawing to describe a search range.

If it is determined at step S25 that the reference coordinates of all columns are found, the dot code image processing circuit 66 goes to step S26 and clears the counter. Next, at step S27, the dot code image processing circuit 66 executes dot detection processing. FIG. 13 is a flowchart to show the dot detection processing in detail. The processing shown in the flowchart of FIG. 13 is performed for the following purpose: If a dot D21 is printed shifting from original print position (reference coordinates) P21, for example, as shown in FIG. 14, it is feared that a dot may be determined to be not printed at the print position P21. Then, in the invention, as shown in FIG. 15, from the original print position P21, the center coordinates thereof are moved in a search range W and whether or not a dot exists in the search range W is determined.

First, at step S61 in FIG. 13, the dot code image processing circuit 66 determines whether or not the density of the pixel in the coordinates (x, y) on which attention is focused is greater than a predetermined threshold value. For example, the dot code image processing circuit 66 determines whether or not the density of the pixel at the point P2 shown in FIG. 12 is greater than a predetermined threshold value. If the density of the pixel is greater than the threshold value, the dot code image processing circuit 66 proceeds to step S62 and determines that a dot exists at the reference position.

If it is determined at step S61 that the density of the pixel in the coordinates (x, y) on which attention is focused is equal to or less than the predetermined threshold value, the dot code image processing circuit 66 proceeds to step S63 and resets an internal counter. In this case, the counter indicates the number of times a search has been executed in the search range W previously described with reference to FIG. 15.

Next, at step S64, the dot code image processing circuit 66 checks the densities of the eight pixels surrounding the pixel in the coordinates (x, y) on which attention is focused. That is, the pixel in the coordinates (x, y) on which attention is focused is the center pixel of three X three pixels and therefore the densities of the four pixels above and below and at the left and right of the center pixel and the four pixels slantingly adjacent to the center pixel are checked.

Next, at step S65, the dot code image processing circuit 66 moves the center pixel of the dot to the pixel in coordinates (x', y') at the highest density. If more than one pixel at the highest density exists among the eight surrounding pixels, the priority levels of the move order are preset from the upper-left corner to the lower-right corner as shown in FIG. 16 and the center pixel of the dot is moved to the highest-priority pixel. At step S66, the dot code image processing circuit 66 determines whether or not the density of the pixel in the coordinates (x', y') is greater than a threshold value, which is the same value as the threshold value at step S61. If it is determined at step S66 that the density of the pixel in the coordinates (x', y') on which attention is focused is greater than the threshold value, the dot code image processing circuit 66 goes to step S62 and determines that a dot is printed at the position.

If it is determined at step S66 that the density of the pixel in the coordinates (x', y') on which attention is focused is equal to or less than the threshold value, the dot code image processing circuit 66 proceeds to step S67 and increments a counter indicating the number of times a move has been made to the eight surrounding pixels by one, then proceeds to step S68 and sets the coordinates (x', y') on which attention is focused to the coordinates (x, y) of the center of the three X three pixels, whereby the center pixel of the three X three pixels is moved.

Next, at step S69, the dot code image processing circuit 66 determines whether or not the counter value is smaller than the predetermined number of times (for example, two). If the counter value is smaller than the predetermined number of times, the dot code image processing circuit 66 returns to step S64 and repeats step S64 and the later steps.

It is determined at step S69 that the counter value is not smaller than the predetermined number of times (is equal to the predetermined number of times), the dot code image processing circuit 66 proceeds to step S70 and determines that a dot does not exist at the position.

Referring again to FIG. 11, after the dot detection processing is thus performed at step S27, the dot code image processing circuit 66 proceeds to step S28 and determines whether or not a dot is detected. If the dot code image processing circuit 66 determines that a dot is detected, it proceeds to step S29 and calculates a distance d between the reference coordinates (x, y) on which attention is focused and the center coordinates (x', y') of the dot detected in the dot detection processing at step S27. This distance d is represented by the following expression:

$$d=((x-x')^2+(y-y')^2)^{1/2}$$

Next, at step S30, the dot code image processing circuit 66 collates the coordinates of the dot detected at step S27 with a detected dot list. That is, the dot code image processing circuit 66 registers the coordinates of the dot calculated at step S29 (detected x coordinate and detected y coordinate) in the detected dot list in internal memory together with the distance d of the coordinates from the reference coordinates and the reference position number corresponding to the detected dot at step S36 (described later), as shown in FIG. 17. List numbers are assigned to the entries as shown in FIG. 17. The reference position numbers are numbers given corresponding to the reference positions from the leftmost coordinate x2 of the data mark 33 to the rightmost coordinate x11, for example, as shown in FIG. 12; numbers 1 to 10 are the reference position numbers in the example in FIG. 12.

Figures 18, 19:
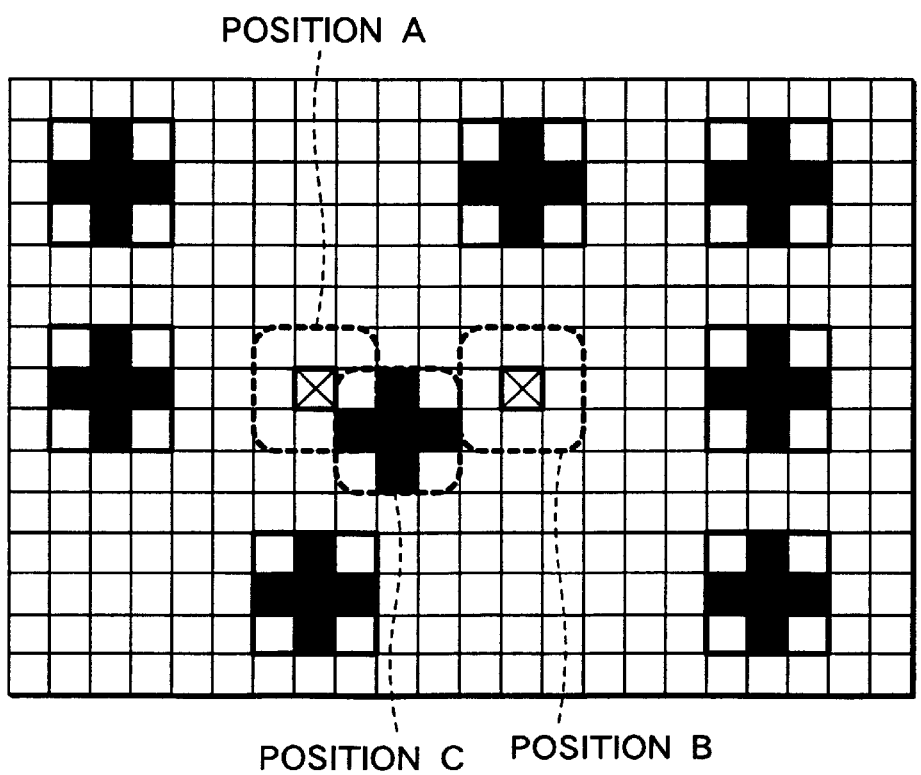
FIG. 18 is a drawing to show an example of a dot detection result list.
FIG. 19 is a drawing to describe double count of a dot whose position is shifted.

At step S31, the dot code image processing circuit 66 determines whether or not the coordinates corresponding to the detected coordinates are registered in the detected dot list. If the corresponding coordinates are not registered in the detected dot list, the dot code image processing circuit 66 goes to step 36 and registers the center coordinates of the detected dot (x', y'), the reference position number to which the reference coordinates at the time correspond, and the distance d calculated at step S29 in the detected dot list, as shown in FIG. 17. Further, at step S18, the dot code image processing circuit 66 sets the value of the dot detection result corresponding to the reference position number being processed in a dot detection result list in the internal memory to 1, as shown in FIG. 18.

If the dot code image processing circuit 66 determines at step S31 that the coordinates corresponding to the detected dot coordinates are already registered in the detected dot list, the dot code image processing circuit 66 goes to step 32 and loads (read) distance d' corresponding to the coordinates already registered in the detected dot list. Then, at step S33, the dot code image processing circuit 66 compares the distanced calculated at step S29 with the distance d' read from the detected dot list and if the distance d is less than the distance d', the dot code image processing circuit 66 proceeds to step S34 and corrects the value of the dot detection result corresponding to the reference position number corresponding to the detected dot coordinates in the detected dot list to 0. As shown in FIG. 18, the dot detection result list stores each reference position number, reference coordinates (reference x coordinate and reference y coordinate) corresponding thereto, and the dot detection result. The dot detection result value 1 represents that the dot corresponding to the reference position number is detected, and the value 0 represents that the dot corresponding to the reference position number is not detected.

At step S35, the dot code image processing circuit 66 deletes the data of the detected coordinates already registered from the detected dot list (FIG. 17) as erroneous determination.

Further, at step S36, the dot code image processing circuit 66 registers the coordinates of the dot detected at step S27, the current reference position number being processed, and the distance d calculated at step S29 in the detected dot list (FIG. 17). Further, at step S37, the dot code image processing circuit 66 sets the value of the dot detection result corresponding to the current reference position number being processed in the dot detection result list (FIG. 18) to 1.

On the other hand, if the dot code image processing circuit 66 determines at step S33 that the distance d is not smaller than the distance d', it proceeds to step S39 and sets the value of the dot detection result corresponding to the current reference position number being processed to 0.

Thus, if the dot to be printed at the original position (reference coordinates) A is printed shifting to position C as shown in FIG. 19, the following is prevented: After it is determined that the dot at the position C is printed at the position A, it is also determined that the dot at the position C is printed at another position (reference coordinates) B, namely, it is doubly determined that the dot at the position C is printed at both the positions A and B.

After steps S37, S38, and S39, the dot code image processing circuit 66 proceeds to step S40 and increments the counter by one. At step S41, the dot code image processing circuit 66 determines whether or not the value of the counter incremented by one at step S40 becomes greater than the maximum value of the number of dots of the data mark 33 contained in one row (the number of columns of the data mark 33). If the counter value does not become greater than the maximum value, the dot code image processing circuit 66 returns to step S27 and repeats step S27 and the later steps. If it is determined at step S41 that the counter value becomes greater than the maximum value of the number of dots in one row, the processing is terminated.

Figure 20:
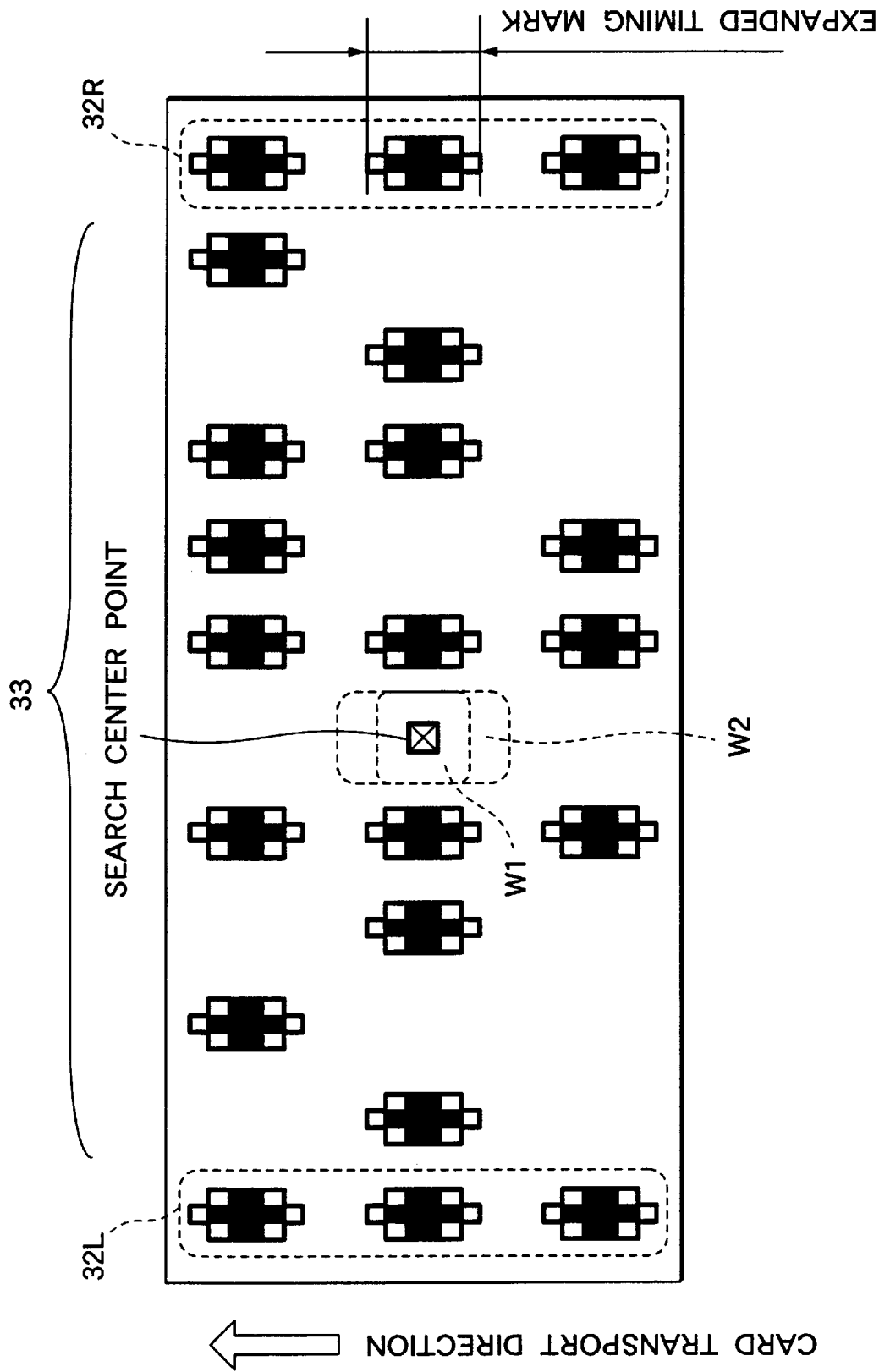
FIG. 20 is a drawing to describe expansion of an image.

If the reader 61 is implemented as a reader of manual operation type and the user manually operates the reader 61 on the card for reading the two-dimensional dot code printed on the card 1, the relative transport speed between the card 1 and the reader 64 does not necessarily become the reference transfer speed in some cases. If the relative transport speed becomes lower than the reference transfer speed, for example, if the relative speed becomes a half the reference speed, one dot to be originally read as three X three pixels is read as 16 pixels as shown in FIG. 20. That is, at this time, the number of pixels in the main scanning direction (lateral direction in FIG. 20) remains to be three, but the number of pixels in the subscanning direction (longitudinal direction in FIG. 20) is increased to six at the center and four at the left and right. In such a case, an image is expanded in the subscanning direction, but not in the main scanning direction. Thus, the search range W can be made longer in the subscanning direction (relative transport direction of the card 1), as shown in FIG. 20, so that if the relative transport speed of the card 1 in the subscanning direction changes and the image is expanded in the subscanning direction, it is made possible to detect dots more reliably.

Figure 9:
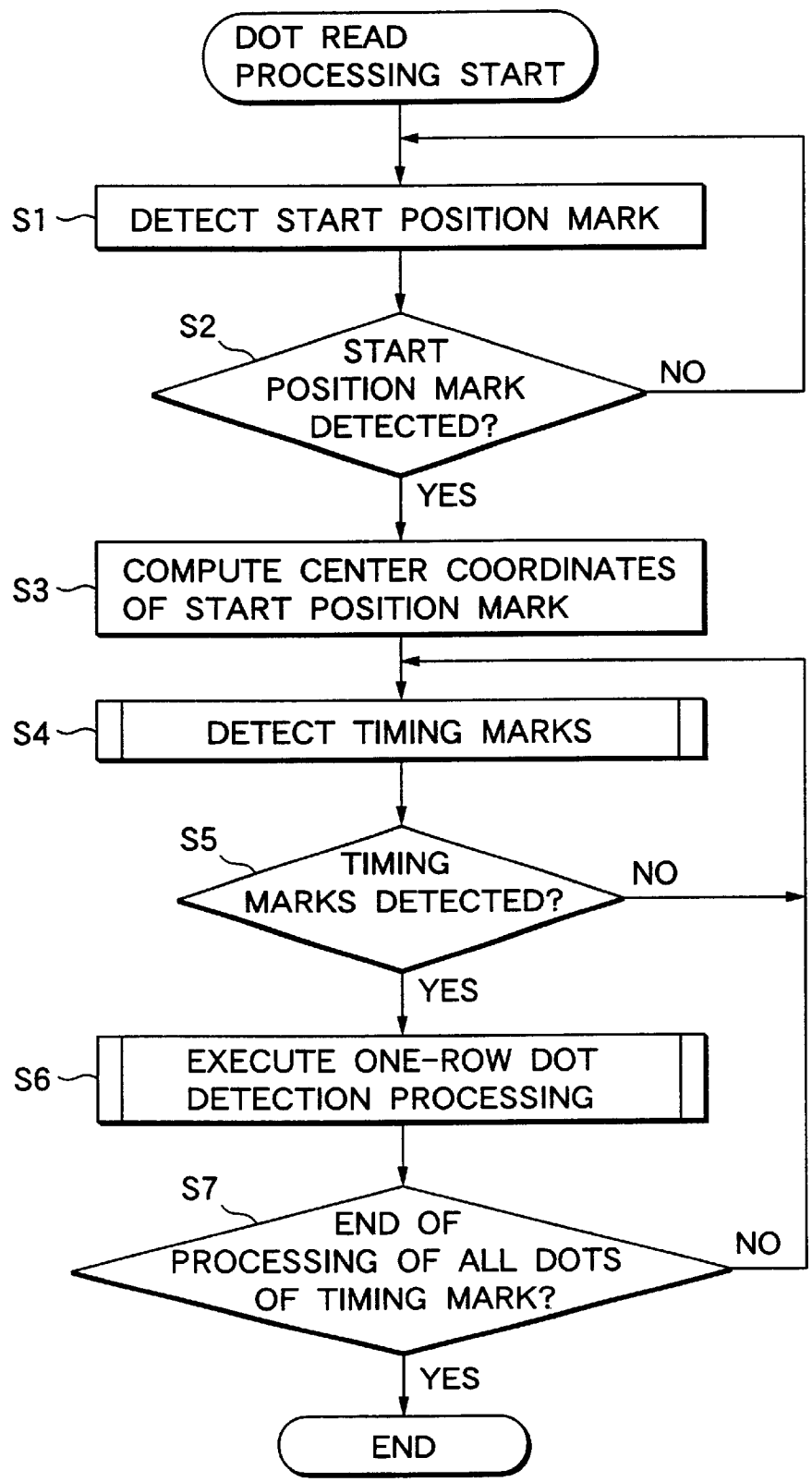
FIG. 9 is a flowchart to describe the dot read operation of the reader in FIG. 7.
Figure 21:
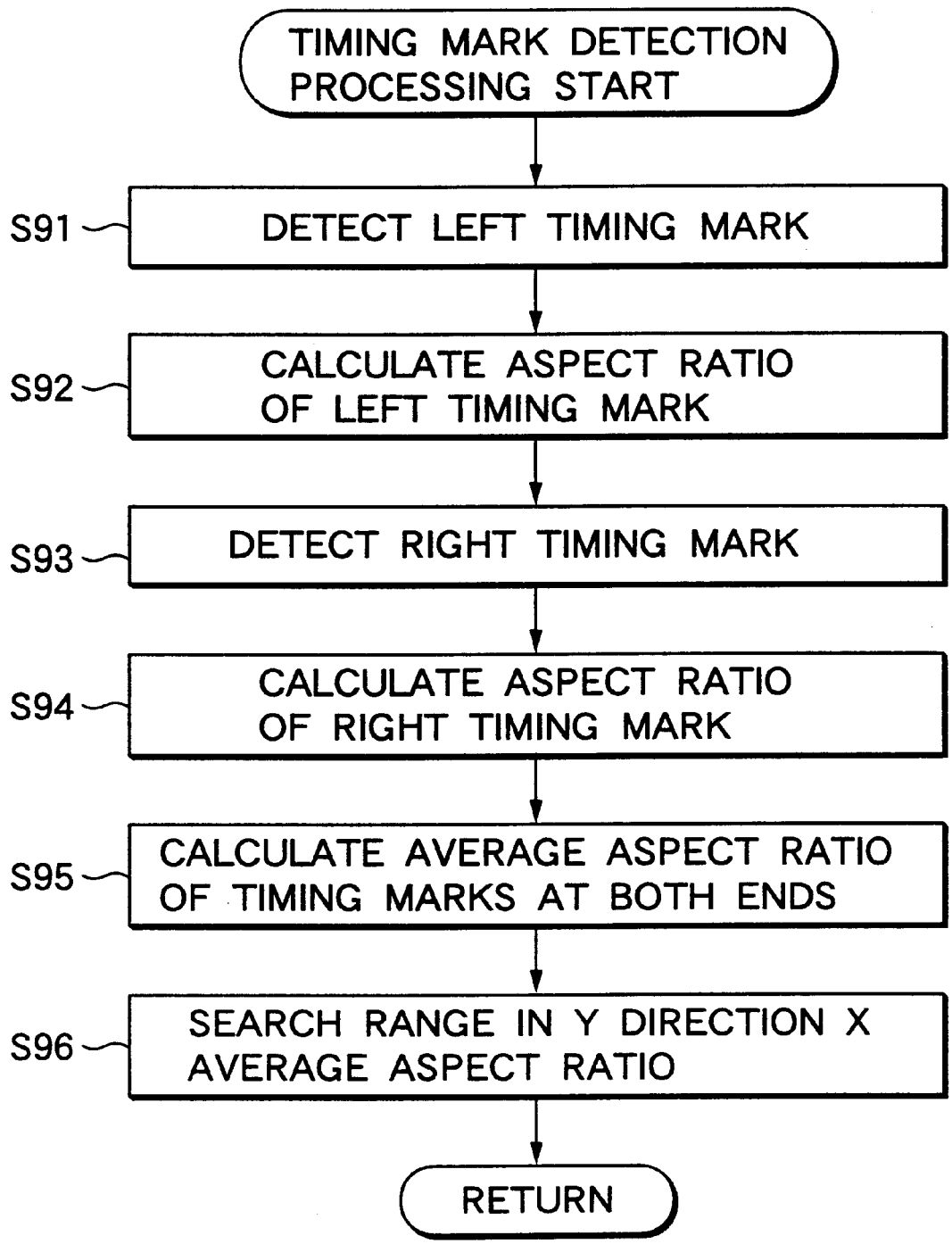
FIG. 21 is a flowchart to describe timing mark detection processing considering expansion of an image.

If the timing mark is expanded in the card transport direction as shown in FIG. 20, to correct this, the timing mark detection processing at step S4 in FIG. 9 is executed as shown in a flowchart of FIG. 21. That is, at step S91, the dot code image processing circuit 66 detects the left timing mark 32L and at step S92, calculates the aspect ratio of the left timing mark 32L. The aspect ratio is the value of the length of the detected dot in the longitudinal direction thereof divided by the length of the dot in the lateral direction thereof and is 2 (=6/3) in the example in FIG. 20.

Next, at step S93, the dot code image processing circuit 66 detects the right timing mark 32R and at step S94, calculates the aspect ratio of the right timing mark 32R. At step S95, the dot code image processing circuit 66 calculates the average value of the aspect ratios calculated at steps S92 and S94. At step S96, the dot code image processing circuit 66 adopts the value of multiplying the length of the original search range W1 in the longitudinal direction thereof (Y direction) by the average aspect ratio calculated at step S95 as the length of the corrected search range W2 in the longitudinal direction thereof, as shown in FIG. 20.

Thus, if the dot length is expanded in the subscanning direction, the search range is changed in response to the expansion proportion. Consequently, it is made possible to determine whether or not a dot exists more accurately.

Figure 22:
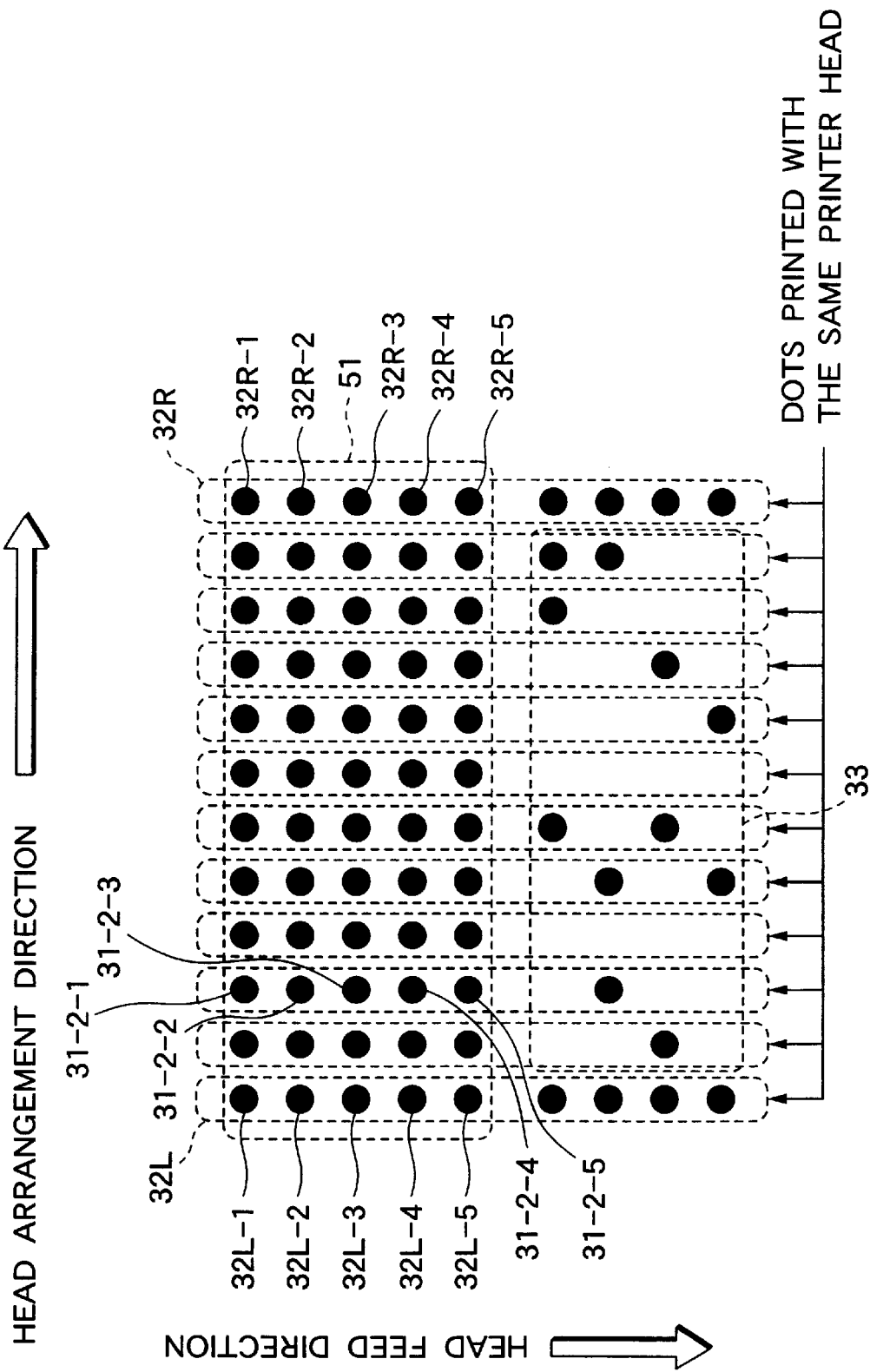
FIG. 22 is a drawing to show an example of a printer head offset sense mark.

FIG. 22 shows another example of a two-dimensional dot code. In the example, the start position mark 31 shown in FIG. 3 is printed on a plurality of rows (in the example in FIG. 22, five rows) to provide a printer head offset sense mark 51. The sense mark 51 consists of dots 32L-1 to 32L-5 and 32R-1 to 32R-5 printed in the same columns as the timing marks 32L and 32R and dots 31-1-i (i=1, 2, . . . , 5) to 31-j-i (j denotes the column of the data mark 33) placed in the columns corresponding to the columns of the data mark 33.

Figure 23:
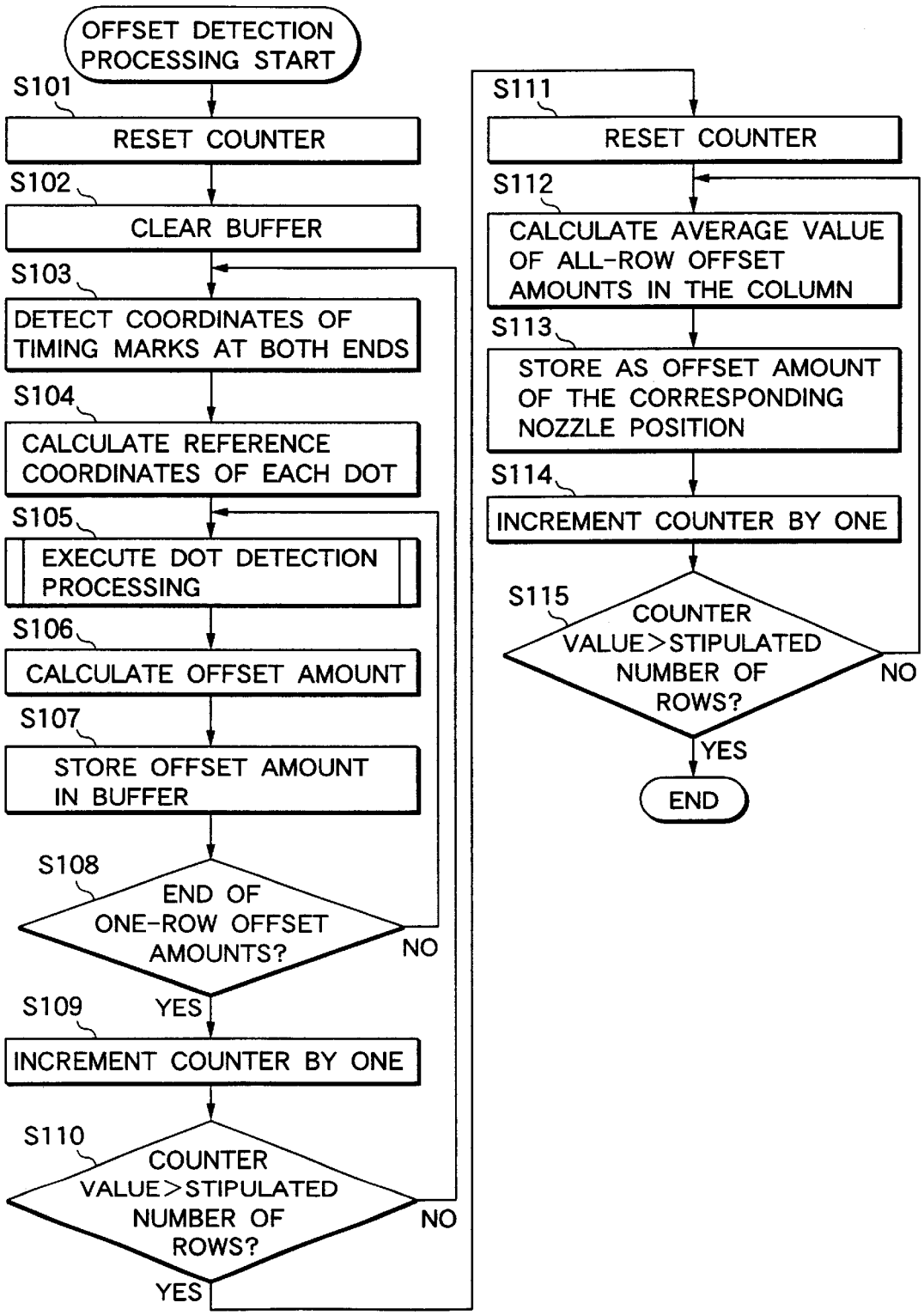
FIG. 23 is a flowchart to describe off set detection processing using the printer head offset sense mark in FIG. 22.

If the sense mark 51 is thus printed, when the dot code image processing circuit 66 detects a start position mark at step S1 previously described with reference to FIG. 9 it further executes offset detection processing shown in FIG. 23.

The dot code image processing circuit 66 resets an internal counter at step S101 and clears an internal buffer at step S102. At step S103, the dot code image processing circuit 66 detects the coordinates of the timing marks 32L and 32R at both ends. At step S104, the dot code image processing circuit 66 calculates the reference coordinates of each dot provided by dividing the line connecting the centers of the left and right timing marks 32L and 32R by the number of columns of the data mark 33.

Next, at step S105, the dot code image processing circuit 66 executes the dot detection processing previously described with reference to the flowchart of FIG. 13. At step S106, the dot code image processing circuit 66 calculates the offset amount with the reference coordinates of the current detected dot. Letting the reference coordinates be (x, y) and the center coordinates of the detected dot be (x', y'), the offset amount in the x direction is represented by the following expression:

$$d_x (i, j) = x - x'$$

The offset amount in the y direction is represented by the following expression:

$$d_y (i, j) = y - y'$$

In the expressions, i denotes the row number and j denotes the column number.

Next, at step S107, the dot code image processing circuit 66 stores the offset amount calculated at step S106 in the buffer. At step S108, the dot code image processing circuit 66 determines whether or not processing for the one-row dots in each column is terminated. If any unprocessed dot remains in the row, the dot code image processing circuit 66 returns to step S105 and repeats step S105 and the later steps.

If the dot code image processing circuit 66 determines at step S108 that the offset amount detection processing for the one-row dots terminates, it proceeds to step S110 and increments the counter for indicating the number of processed rows by one. At step S110 the dot code image processing circuit 66 determines whether or not the counter value becomes greater than the stipulated number of rows set as the printer head offset sense mark 51. If the dot code image processing circuit 66 determines that the counter value does not become greater than the stipulated number of rows, it returns to step S103 and repeats step S103 and the later steps.

If the dot code image processing circuit 66 determines that the counter value becomes greater than the stipulated number of rows, it proceeds to step S111 and resets the counter value. At step S112, the dot code image processing circuit 66 calculates the average value of the all-row offset amounts in one column. In the example in FIG. 22, the average value of five-row offset amounts in one column is calculated.

Figure 24:
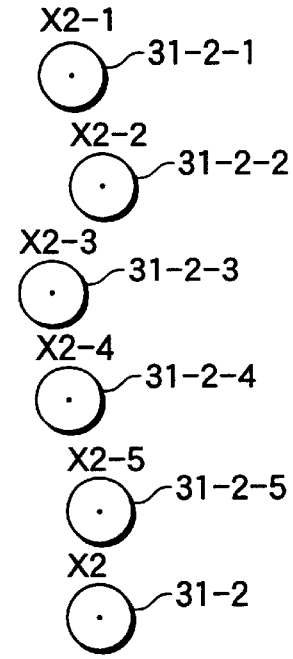
FIG. 24 is a drawing to describe calculation of the average value of x coordinates.
Figure 25:
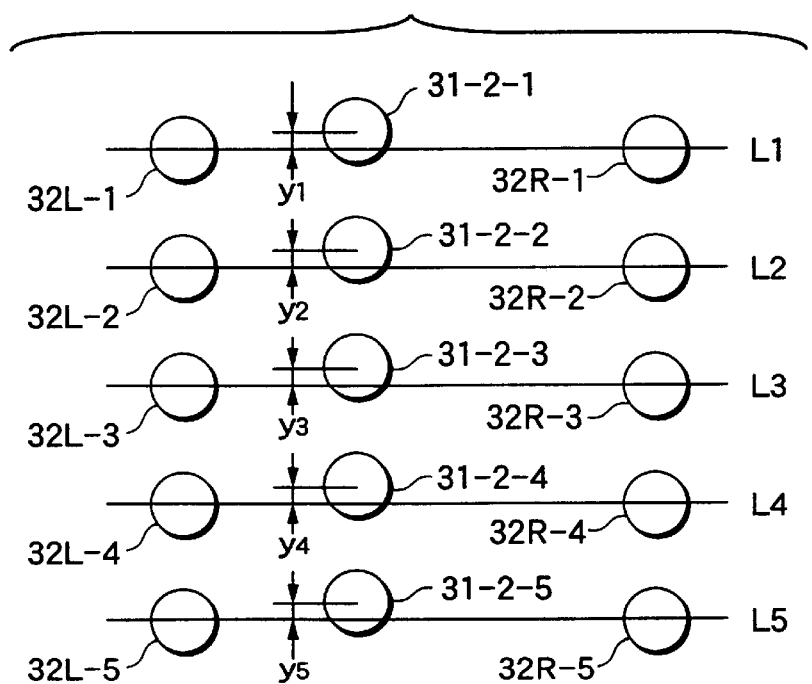
FIG. 25 is a drawing to describe calculation of the average value of y coordinates.

The average value of the offset amounts is schematically shown as in FIGS. 24 and 25. That is, for example, as shown in FIG. 24, the x coordinates of the detected dots 31-2-1 to 31-2-5 are x2-1 to x2-5, the average value of the x coordinates, $x_a$, is calculated according to the following expression:

$$x_a = (x2-1 + x2-2 + x2-3 + x2-4 + x2-5)/5$$

The average value $x_a$ thus found is used as the coordinate x2 representing the dot 31-2 in the column. This value is used as the coordinate x2 shown in FIG. 12.

As shown in FIG. 25, when the line connecting the dots 32L-1 and 32R-1 to the line connecting the dots 32L-5 and 32R-5 are L1 to L5, y coordinate differences between the dots 31-2-1 to 31-2-5 and the lines L1 to L5, y1 to y5, are found and the average value of y1 to y5, $Y_a$, is found as shown in the following expression:

$$y_a = (y1 + y2 + y3 + y4 + y5)/5$$

Next, at step S113, the dot code image processing circuit 66 stores the average value calculated at step S112 in the buffer as the offset amount of the nozzle of the corresponding column. At step S114, the dot code image processing circuit 66 increments the counter for indicating the number of processed columns by one. At step S115, the dot code image processing circuit 66 determines whether or not the counter value becomes greater than the predetermined number of columns (the number of columns of the data mark 33 in FIG. 22). If the dot code image processing circuit 66 determines that the counter value is not greater than the predetermined number of columns, it returns to step S112 and repeats step S112 and the later steps. If it is determined at step S115 that the counter value becomes greater than the predetermined number of columns, the offset detection processing is terminated.

Figure 10:
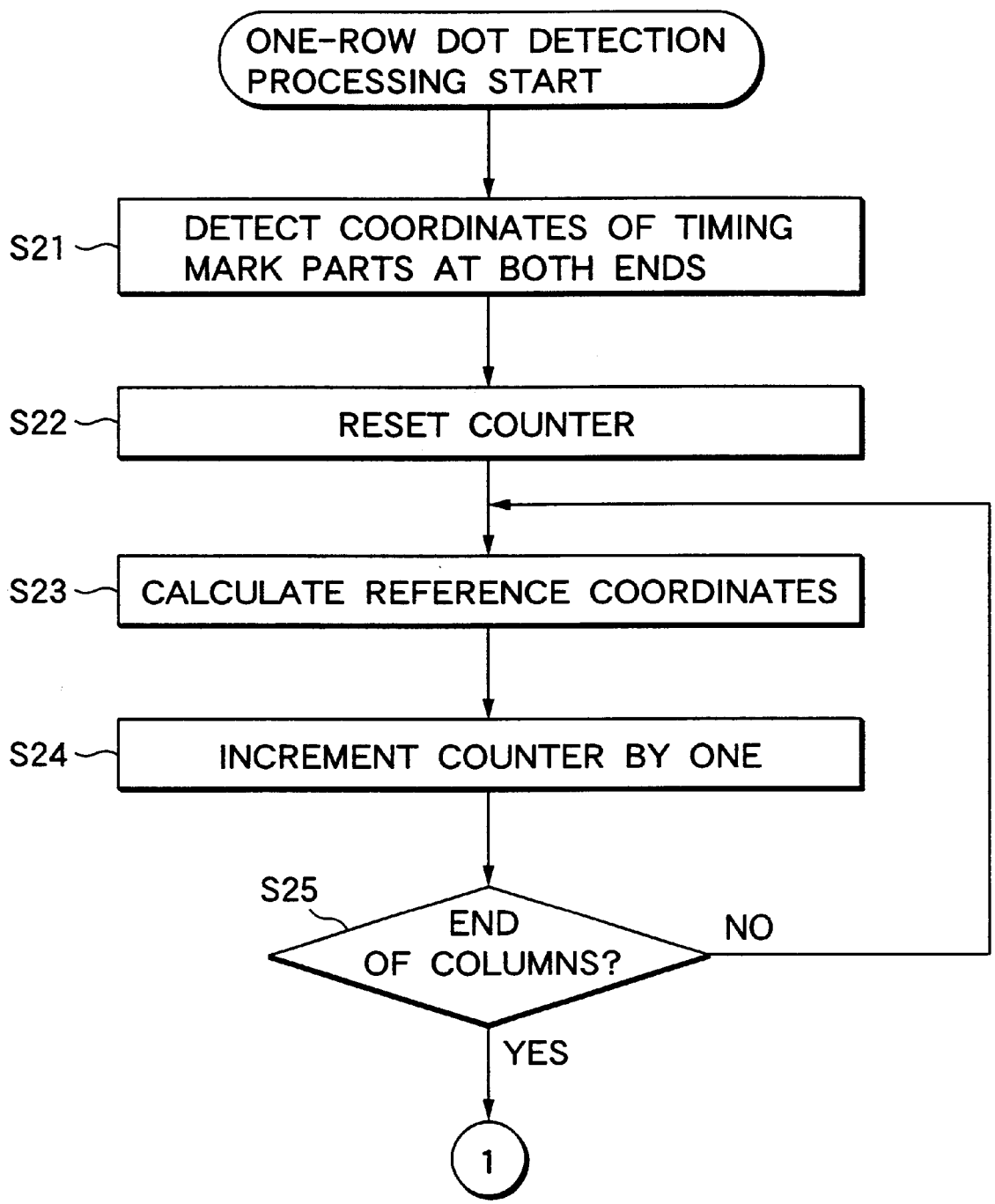
FIG. 10 is a flowchart to describe details of one-row dot detection processing at step S6 in FIG. 9.
Figure 11:
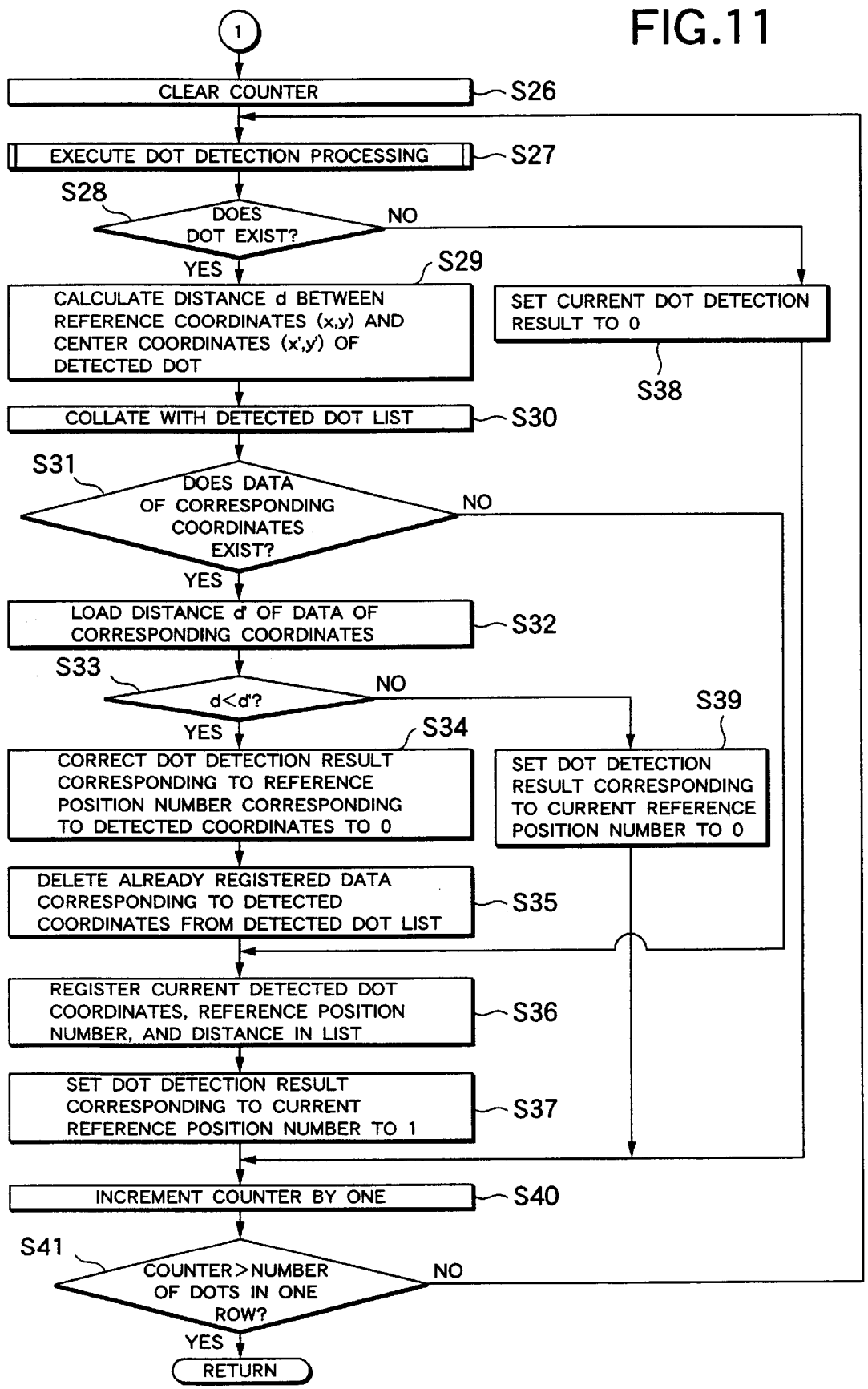
FIG. 11 is a flowchart to describe details of one-row dot detection processing at step S6 in FIG. 9.
Figure 12:
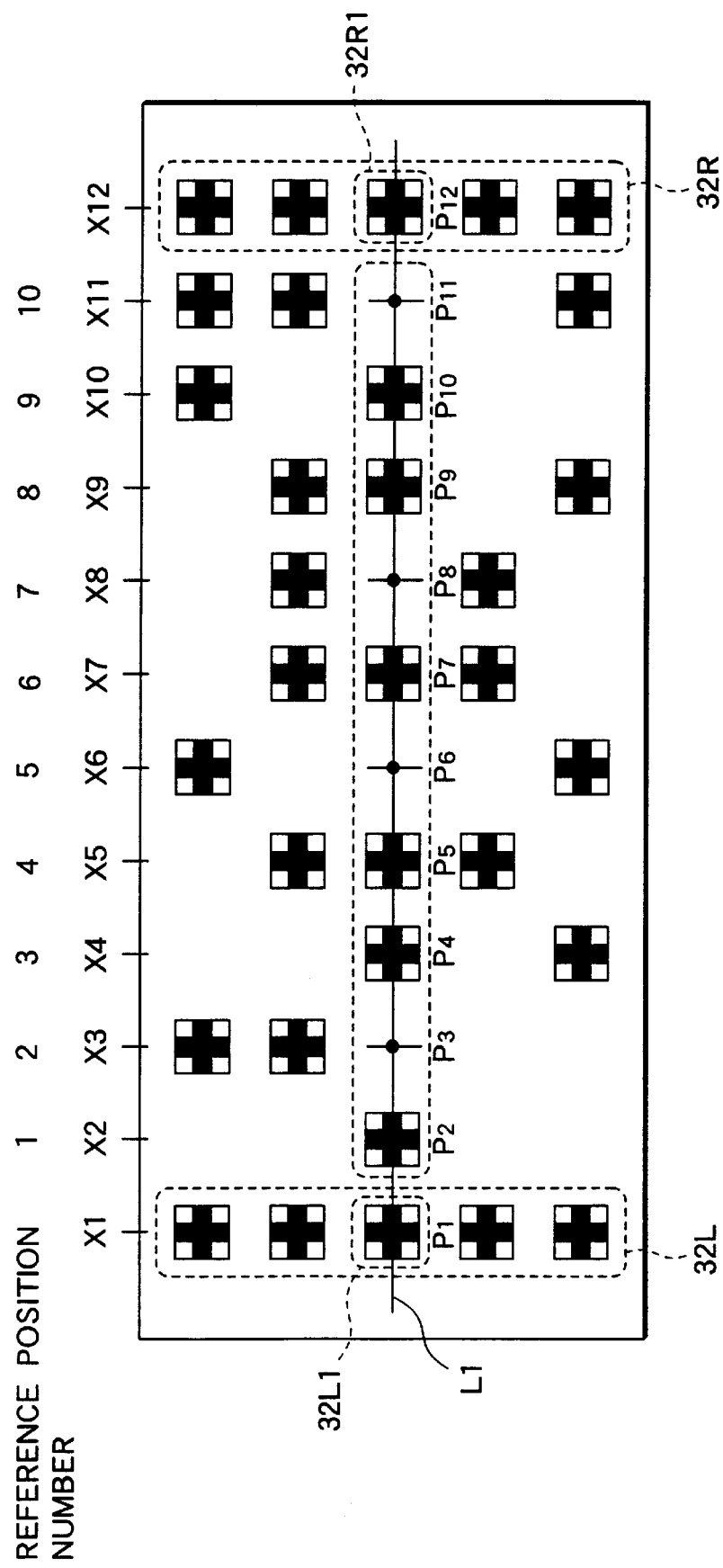
FIG. 12 is a drawing to describe dot detection processing at step S27 in FIG. 11.
Figure 26:
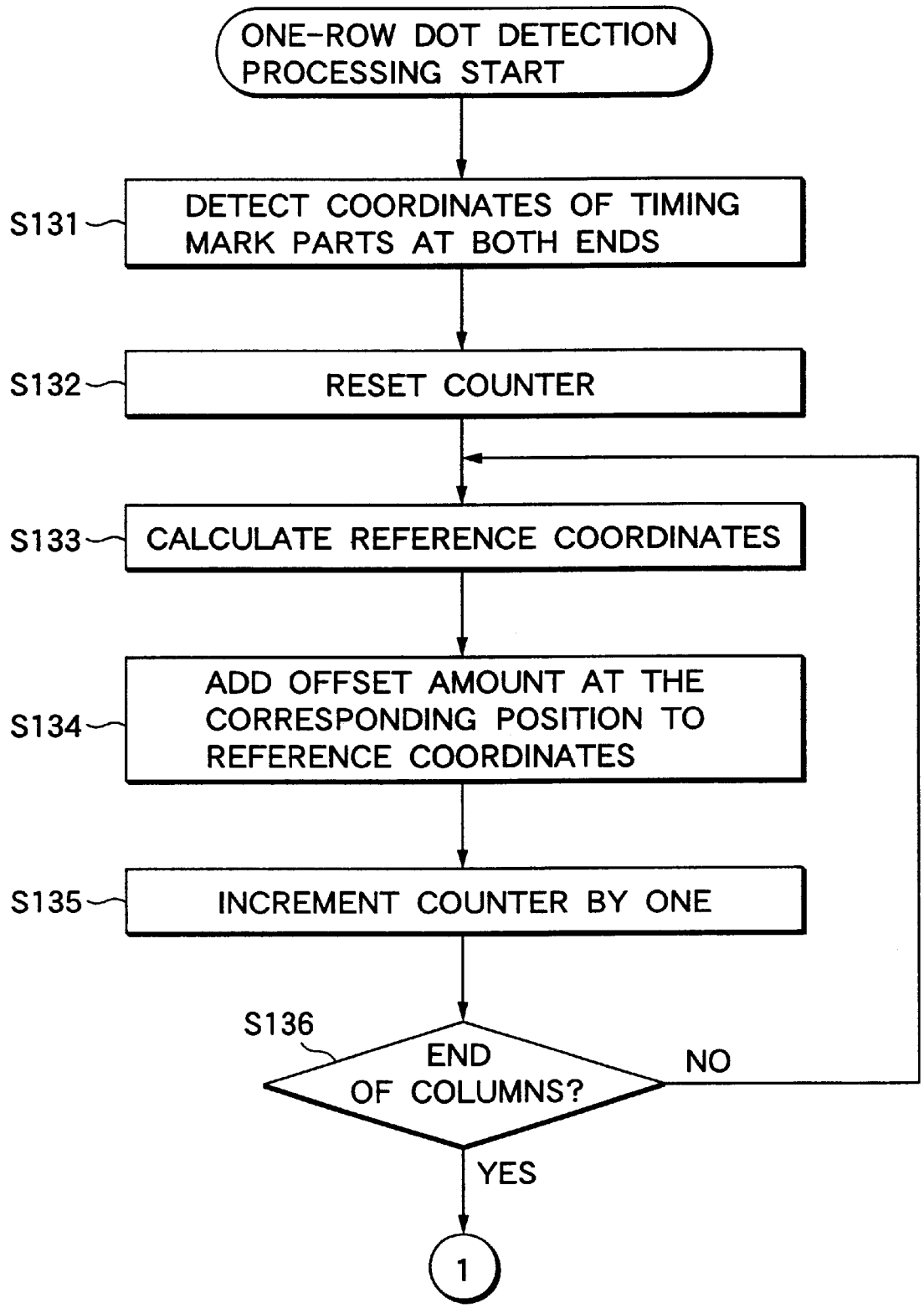
FIG. 26 is a flowchart to describe details of one-row dot detection processing at step S6 in FIG. 9.
Figure 27:
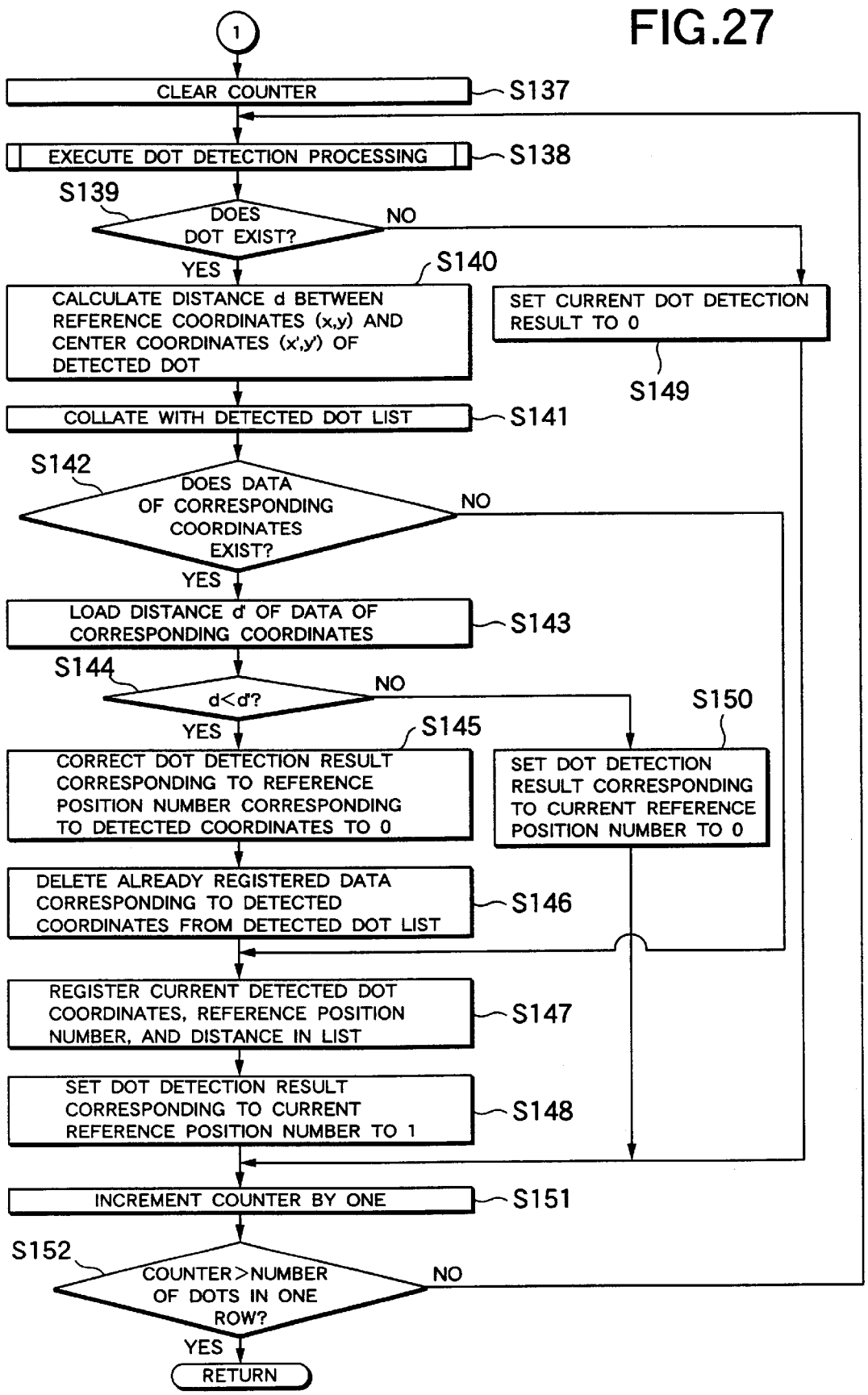
FIG. 27 is a flowchart to describe details of one-row dot detection processing at step S6 in FIG. 9.

If the offset amount is thus calculated, the one-row dot detection processing previously described with reference to FIGS. 10 and 11 is executed as shown in FIGS. 26 and 27. Steps S131 to S152 shown in FIGS. 26 and 27 basically are similar to steps S21 to S41 in FIGS. 10 and 11; however, step S134 is added between steps S133 and S135 in FIG. 26 corresponding to steps S23 and S24 in FIG. 10. At step S134, the dot code image processing circuit 66 adds the offset amount provided in the processing previously described with reference to FIG. 23 to the reference coordinates calculated at step S133. That is, the reference coordinates (x, y) in the column j is corrected as follows:

$$(x+D_x(j), y+D_y(j))$$

where $D_x(j)$ and $D_y(j)$ denote the average value of the offset value in the x direction in the column j and the offset value in the y direction in the column j as in the following expressions: Average value of offset in x direction in column j $$D_x(j) = \frac{\sum_{i=1}^{L} d_x(i, j)}{L}$$

Average value of offset in y direction in column j $$D_y(j) = \frac{\sum_{i=1}^{L} d_y(i, j)}{L}$$

Thus, if there are variations in attachment positions of the print nozzles 101 of the print head 16 for printing dots, it is made possible to compensate for the variations for executing read processing. Consequently, it is made possible to read dots accurately without much improving the precision of the printer 11 or the reader 61.

Figure 28:
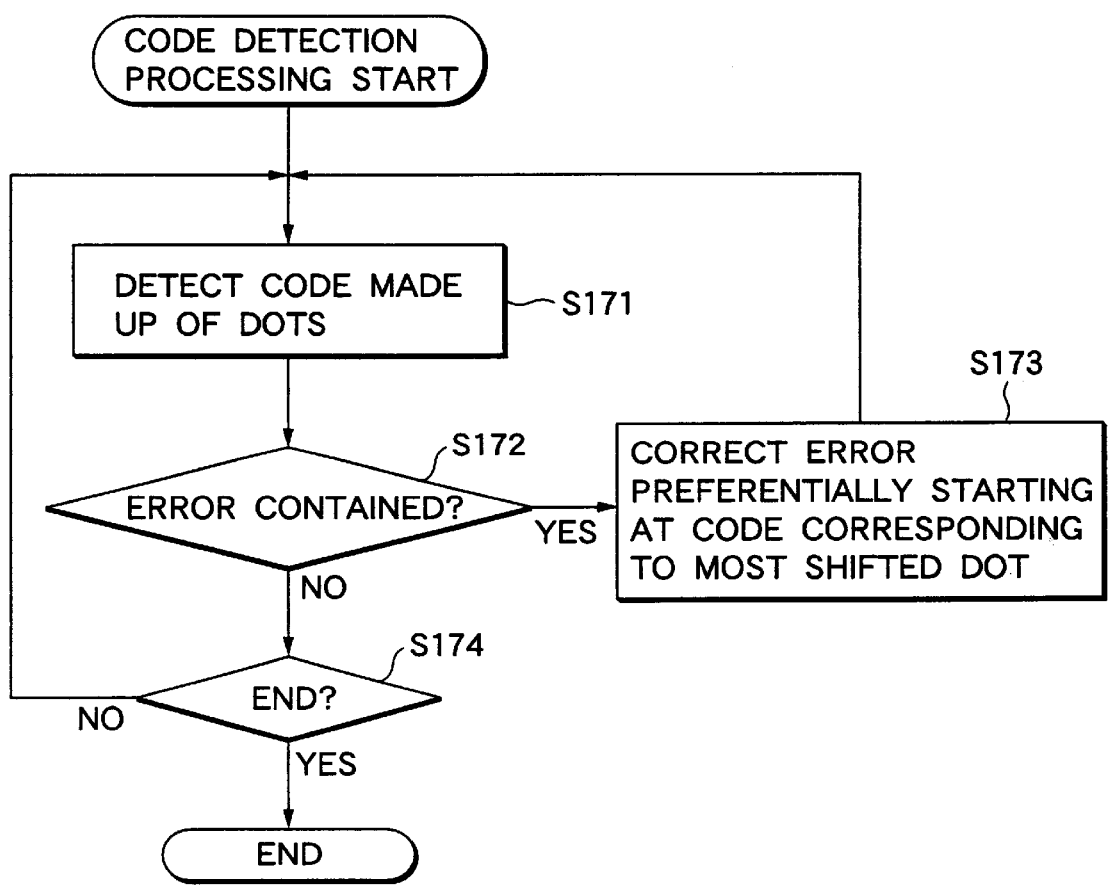
FIG. 28 is a flowchart to describe code detection processing of the reader in FIG. 7.

The dot code image processing circuit 66 thus determines the code from the presence or absence of each of the dots making up the data mark 33 and outputs the determination result. An error correction code can be contained in the code. In this case, the dot code image processing circuit 66 executes code detection processing as shown in FIG. 28.

That is, first, at step S171, the dot code image processing circuit 66 detects a code made up of dots. At step S172, the dot code image processing circuit 66 uses the error detection code contained in the code to determine whether or not the detected code contains an error. If an error is contained, the dot code image processing circuit 66 proceeds to step S173 and executes processing of correcting the error preferentially starting at the code corresponding to the dot most shifted from the reference position. Then, the dot code image processing circuit 66 returns to step S171 and repeats step S171 and the later steps.

If the dot code image processing circuit 66 determines at step S172 that an error is not contained, it proceeds to step S174 and determines whether or not detection processing of all codes is terminated. If a code whose detection is not yet complete exists, the dot code image processing circuit 66 returns to step S171 and repeats step S171 and the later steps. If it is determined at step S174 that detection processing of all codes is terminated, the code detection processing is terminated.

In doing so, it is made possible to complete the error correction processing promptly.

Further, additional examples of the two-dimensional dot code according to the present invention will be described as follows.

Figure 29A:
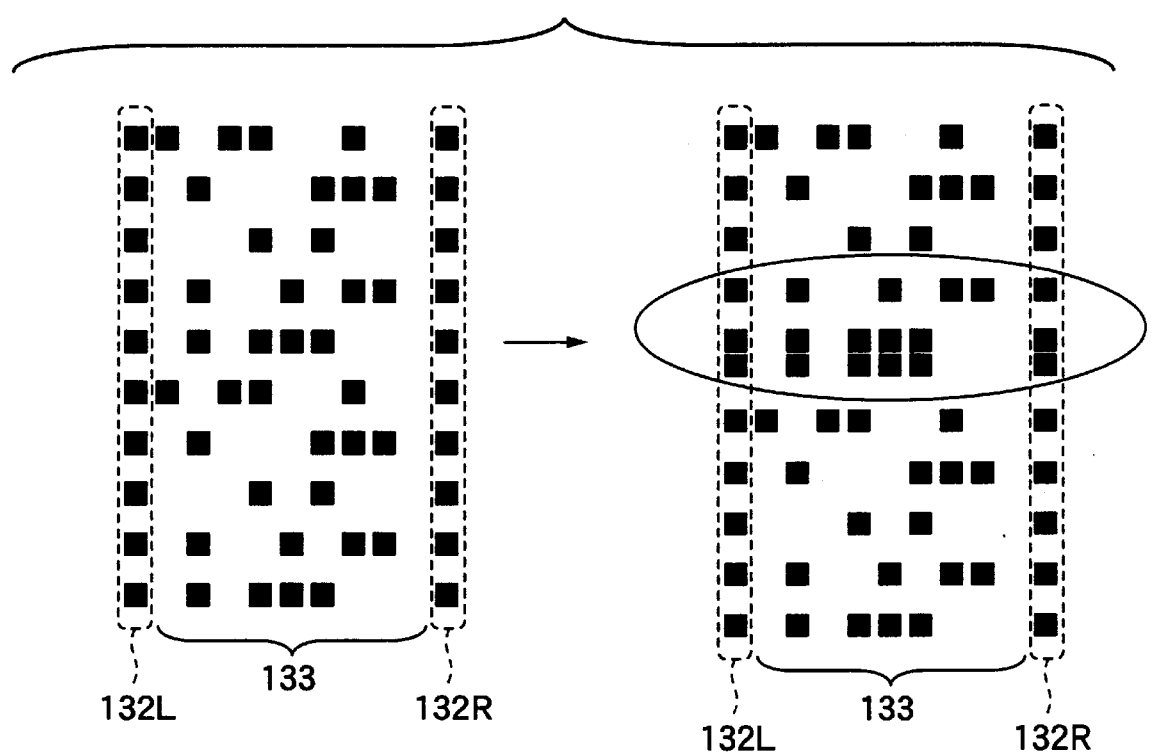
FIGS. 29A and 29B are schematic drawings to show an example of a two-dimensional dot code incorporating the invention.
Figure 29B:
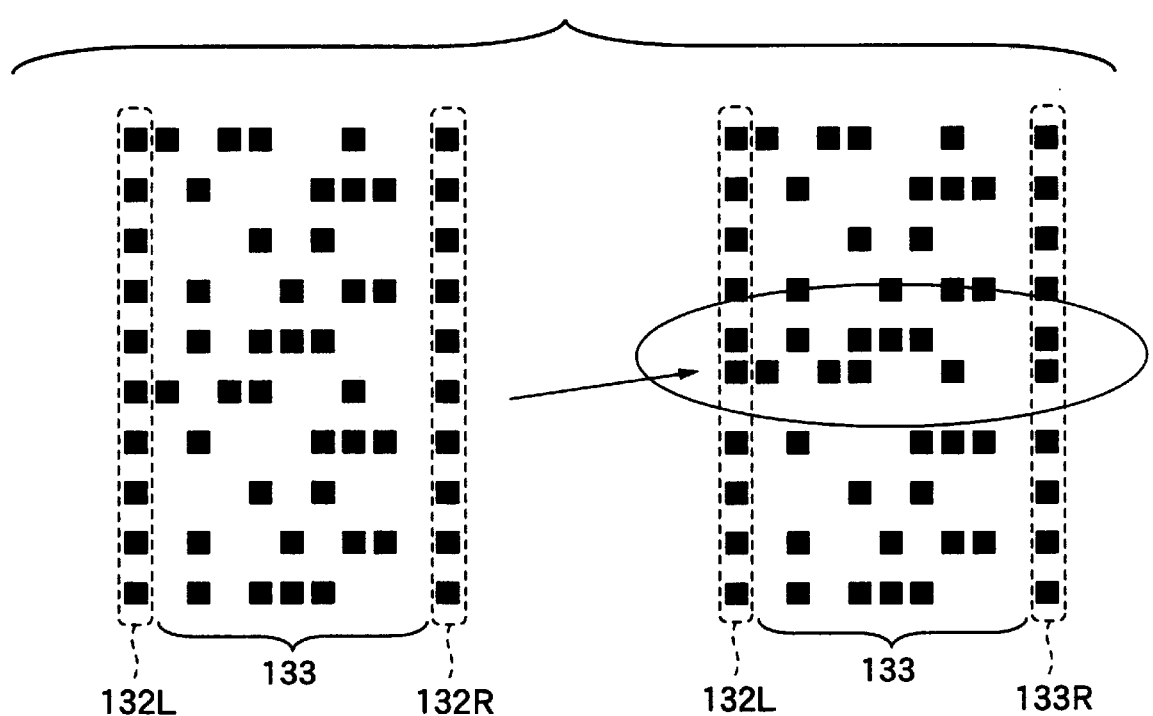

That is, according to examples as shown in FIGS. 29A and 29B, in the two-dimensional dot code according to the present invention, timing marks 132L and 132R for indicating positions of dots 133 for representing the code are provided at both ends (or one end) on lines in a direction perpendicular to a read direction of the dots 133 for representing the code. The shape of the timing marks 132L and 132R is the same as that of the dots 133 for representing the code. In these examples, one dot is provided by one dot of the printer, and similarly, one timing mark is provided by one dot of the printer.

For example, as shown in FIG. 29A, when an image is expanded due to the transport irregularity of reading, the timing marks at both ends are also expanded. Accordingly, it is possible to detect the transport irregularity by using the timing mark. Thus, it is possible to enhance the accuracy of the code recognition.

Further, as shown in FIG. 29B, even if the dots 133 are printed at shifted positions due to the shape of the printing nozzle, because the timing marks at both ends are also printed at shifted positions, it is possible to surely recognize the code.

In these examples, the code is represented by one dot of the printer, and similarly, the timing mark is represented by one dot. Thus, it is possible to surely presume the printing condition of dots 133 for representing the code by using the timing mark. Therefore, it is possible to enhance the recognition ratio of the code.

As described above, according to the two-dimensional dot code, the timing marks for indicating the positions of dots for representing the code are placed at at least one end on the line in a direction perpendicular to the read direction of the dots for representing the code. Thus, it is made possible to provide the two-dimensional dot code that can be read accurately.

According to the reader, the positions of timing marks are detected and the dots representing the code placed between the timing marks are detected based on the timing marks, so that it is made possible to detect the presence or absence of each dot accurately.

What is claimed is:

1. A two-dimensional dot code comprising:
    a plurality of dots placed in two dimensions of a data field for representing a predetermined code, said two dimensions being made up of a plurality of rows of said dots; and
    a plurality of timing marks for indicating positions of the dots within said data field, said timing marks being located at at least one end of predetermined ones of said plurality of rows of said dots, each of said plurality of rows of said dots running in a direction perpendicular to a read direction of the dots for representing the code, a line running through a center of each of said plurality of timing marks representing a center of a corresponding row of said data field such that a center of a dot located on said corresponding row in said data field is located either on said line or within a predetermined search range relative to said line.

2. The two-dimensional dot code as claimed in claim 1, wherein a shape of the timing marks is the same as that of the dots.

3. The two-dimensional dot code as claimed in claim 1, wherein, in a case that each of the dots is provided by one dot of a printer, each of the timing marks is provided by one dot of a printer.

4. The two-dimensional dot code as claimed in claim 1, wherein timing marks for indicating positions of the dots for representing the code is provided at both ends on lines in a direction perpendicular to a read direction of the dots for representing the code.

5. The two-dimensional dot code as claimed in claim 1, wherein the timing mark is recorded more than once at the same position and is formed.

6. The two-dimensional dot code as claimed in claim 1, wherein the dots contain dots for an error detection code.

7. A reader for reading a two-dimensional dot code comprising dots placed in two dimensions of a data field for representing a predetermined code, said data field being made up of a plurality of rows of said dots, said reader comprising:

first detection means for detecting positions of respective pairs of timing marks placed at both ends of each of said plurality of rows of said dots, a line running through a center of each pair of tiring marks representing a center of a corresponding row of said data field; and second detection means for detecting the dots representing the code between the timing marks such that a center of a dot located on said corresponding row in said data field is located either on said line or within a predetermined search range relative to said line.

8. The reader as claimed in claim 7, wherein if the dot does not exist at the position with the timing mark as reference, said second detection means searches for the dot in the surroundings of the position.

9. The reader as claimed in claim 7, wherein the dots contain dots for an error detection code, further including error correction means for making an error correction using the error detection code and upon detection of an error, for correcting preferentially an error caused by the dot most shifted from the position with the timing mark as reference.

10. The reader as claimed in claim 7, wherein said second detection means detects a position shift of the dot placed before the dot representing the code and detects the dot representing the code based on the detected position shift.

* * * * *